(12) United States Patent
Kawahara et al.

(10) Patent No.: US 8,798,832 B2
(45) Date of Patent: Aug. 5, 2014

(54) ELECTRIC STORAGE DEVICE

(75) Inventors: Youhei Kawahara, Hitachi (JP); Kei Sakabe, Hitachi (JP); Akihiko Emori, Hitachi (JP)

(73) Assignees: Hitachi, Ltd., Tokyo (JP); Hitachi Vehicle Energy, Ltd., Hitachinaka-shi (JP)

( * ) Notice: Subject to any disclaimer, the term of this patent is extended or adjusted under 35 U.S.C. 154(b) by 519 days.

(21) Appl. No.: 13/201,992

(22) PCT Filed: Feb. 4, 2010

(86) PCT No.: PCT/JP2010/051586
§ 371 (c)(1),
(2), (4) Date: Aug. 17, 2011

(87) PCT Pub. No.: WO2010/109956
PCT Pub. Date: Sep. 30, 2010

(65) Prior Publication Data
US 2011/0313613 A1    Dec. 22, 2011

(30) Foreign Application Priority Data
Mar. 27, 2009    (JP) .................................. 2009-078014

(51) Int. Cl.
*H02J 7/00* (2006.01)
*G01R 31/36* (2006.01)

(52) U.S. Cl.
USPC ............................. 701/22; 701/32.7; 701/34.4

(58) Field of Classification Search
CPC ................ Y02T 10/92; B60L 11/1861; B60L 2240/547; B60L 11/1866; B60L 3/0046; B60L 11/1864; H02J 7/0022; H02J 2007/0067; H02J 3/32; H02J 7/0013; H02J 7/0047; G01R 31/3658; B60W 2510/244; B60W 10/08

USPC ........ 701/22, 36, 29.1, 31.4, 32.7, 34.3, 34.4; 320/118, 132, 136, 159, 161, 164; 180/65.29
See application file for complete search history.

(56) References Cited

U.S. PATENT DOCUMENTS 6,072,300 A * 6/2000 Tsuji ............................. 320/116
8,401,779 B2 * 3/2013 Troncoso et al. ............. 701/123
(Continued)

FOREIGN PATENT DOCUMENTS

| JP | 11-149944 A | 6/1999 |
| JP | 2000-92732 A | 3/2000 |

(Continued)

OTHER PUBLICATIONS

International Search Report including English language translation dated May 18, 2010 (Eight (8) pages).

*Primary Examiner* — Jason Holloway
(74) *Attorney, Agent, or Firm* — Crowell & Moring LLP

(57) ABSTRACT

An electric storage device including a state detection unit managing and controlling the state of a battery unit, wherein the state detection unit captures an inter-terminal voltage of each of a plurality of batteries measured by a battery management unit in a no-load state where the battery unit is separated from a load, and calculates variation information about the states of charge of the batteries. In addition, the state detection unit, taking into consideration the variation information about the states of charge of the batteries, calculates allowable charge and discharge information required for controlling the charging and discharging of the battery unit in a loaded state where the battery unit is connected to a load and charged or discharged, and outputs the allowable charge and discharge information to a charge and discharge device in the battery unit.

23 Claims, 17 Drawing Sheets

(56) References Cited

U.S. PATENT DOCUMENTS

| | | |
|---|---|---|
| 2008/0156551 A1 | 7/2008 | Kawahara et al. |
| 2009/0087722 A1* | 4/2009 | Sakabe et al. ............... 429/61 |
| 2010/0185405 A1* | 7/2010 | Aoshima et al. ............. 702/63 |
| 2010/0244847 A1* | 9/2010 | Kudo et al. ................. 324/433 |
| 2011/0251745 A1* | 10/2011 | Yamamoto et al. .......... 701/22 |
| 2012/0173179 A1* | 7/2012 | Matsumoto ................... 702/63 |

FOREIGN PATENT DOCUMENTS

| | | |
|---|---|---|
| JP | 2001-6751 A | 1/2001 |
| JP | 2002-291104 A | 10/2002 |
| JP | 2004-351998 A | 12/2004 |
| JP | 2005-12960 A | 1/2005 |
| JP | 3975798 B2 | 6/2007 |
| JP | 2008-104289 A | 5/2008 |
| JP | 2008-143475 A | 6/2008 |

* cited by examiner

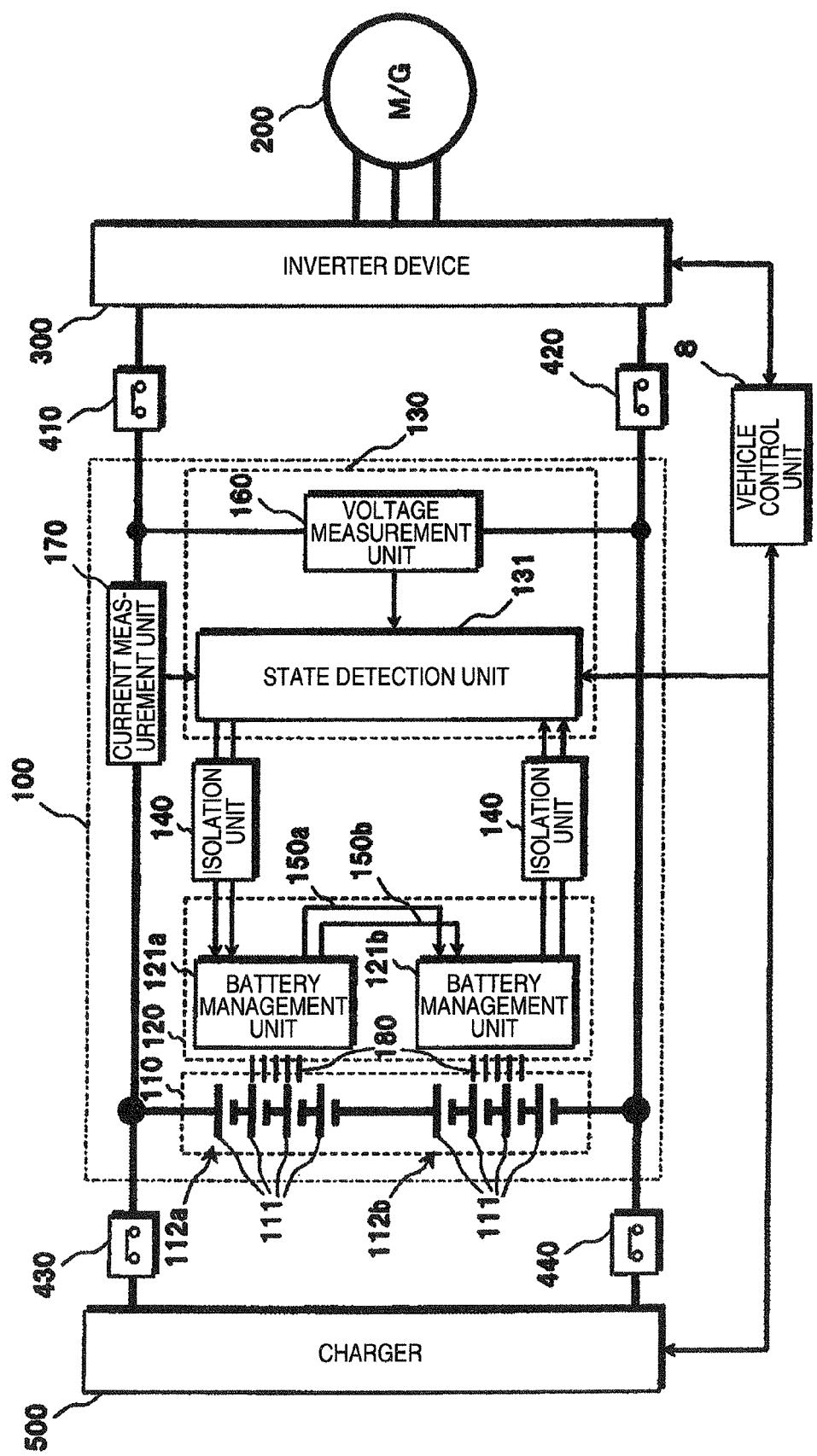

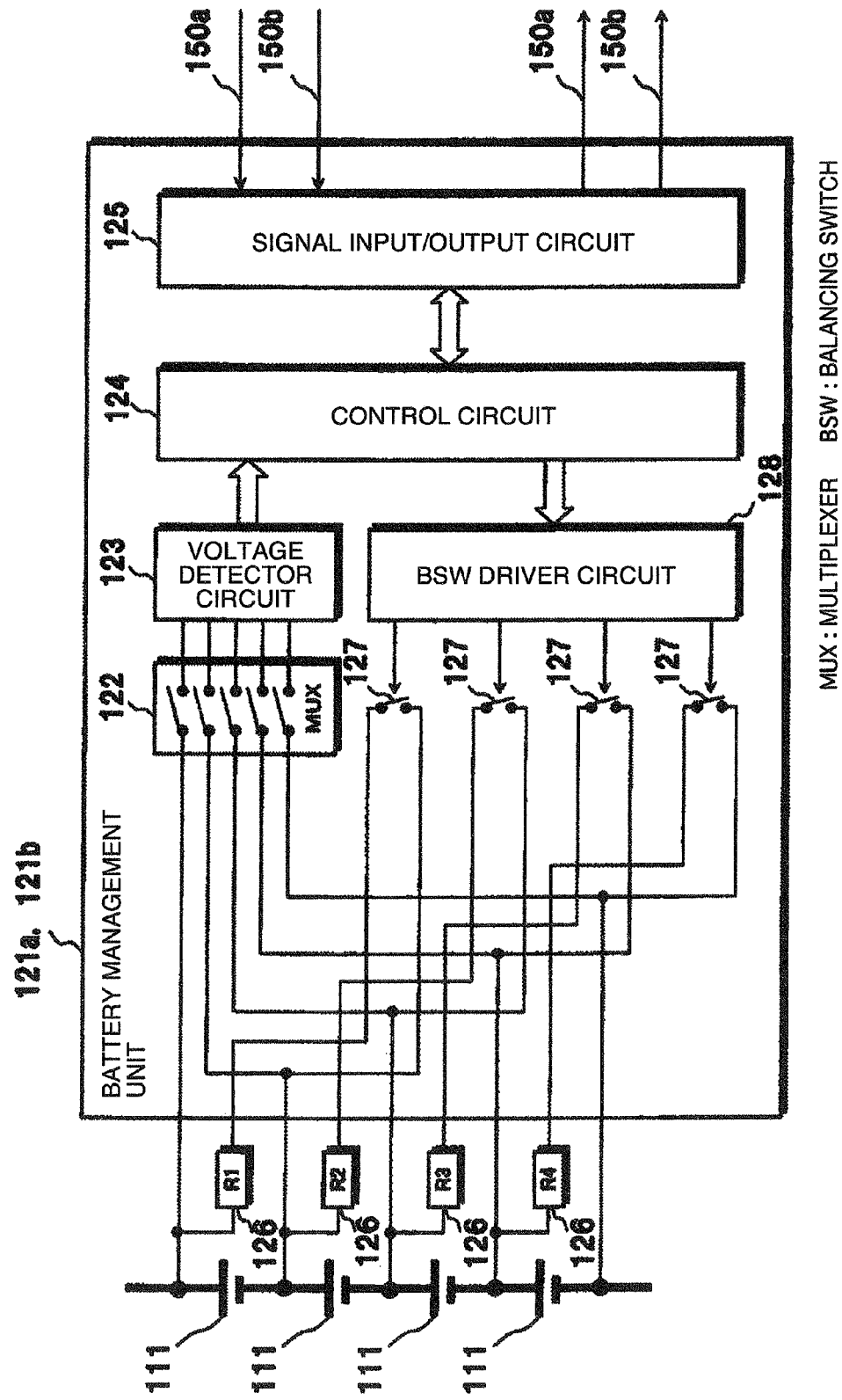

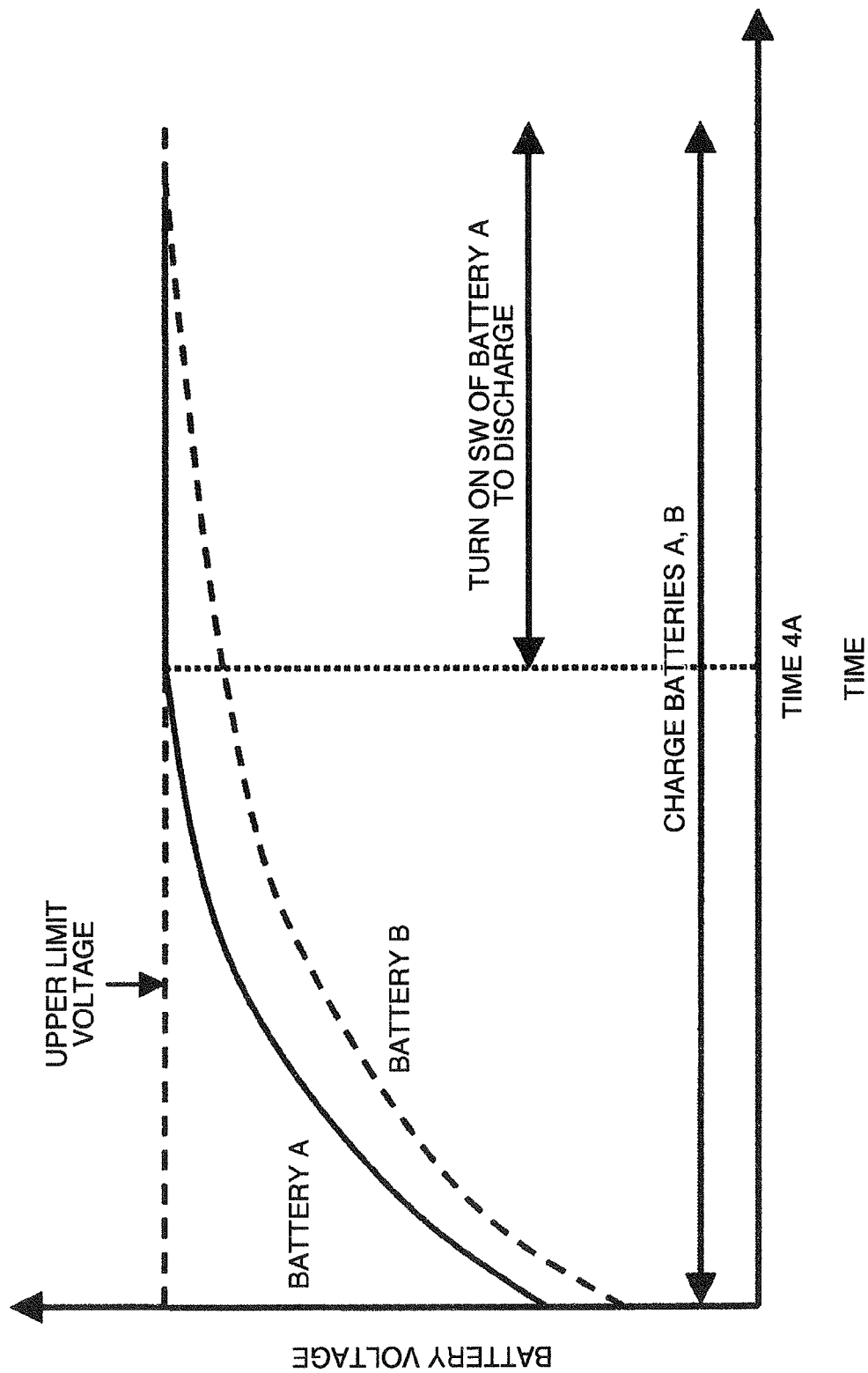

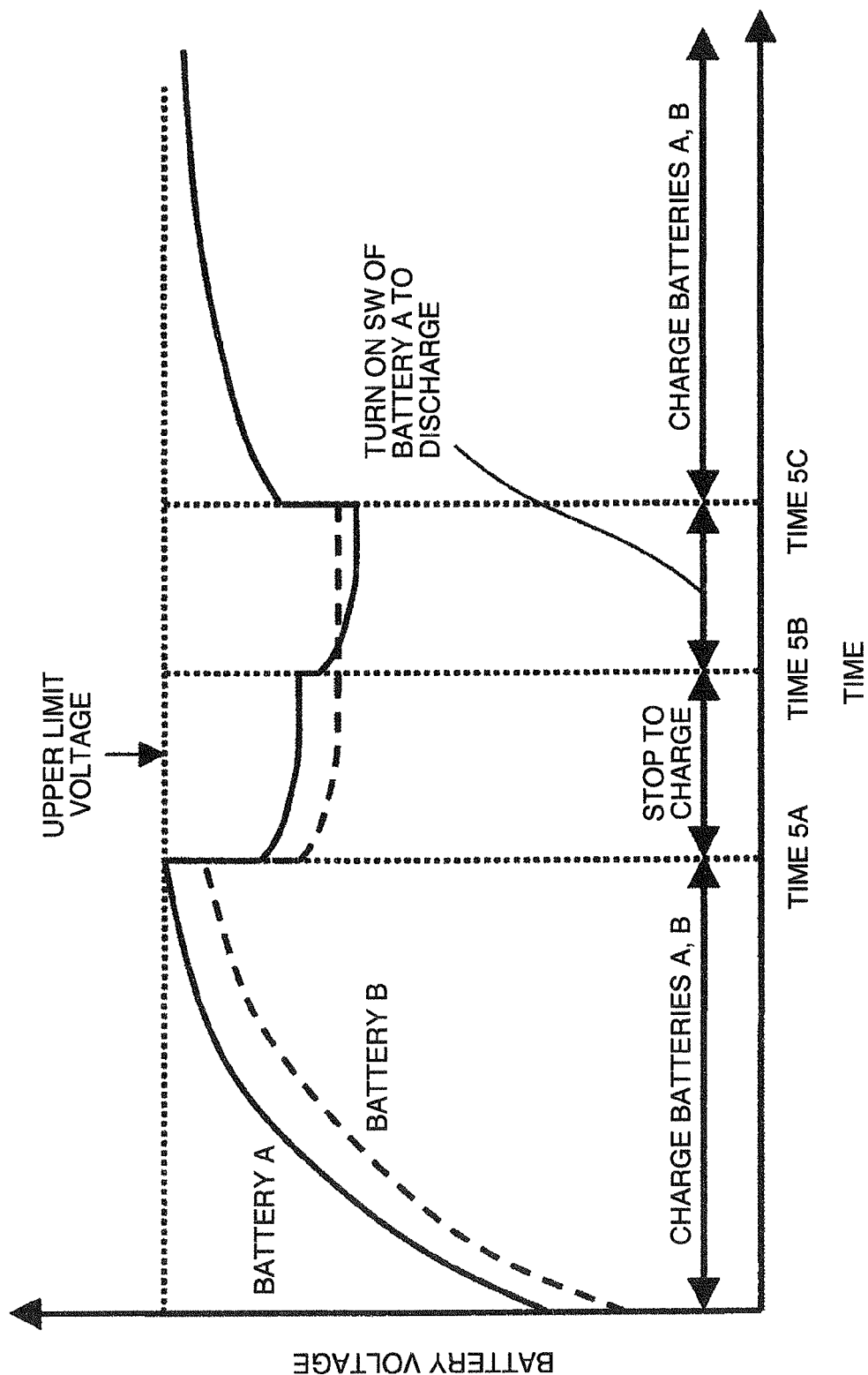

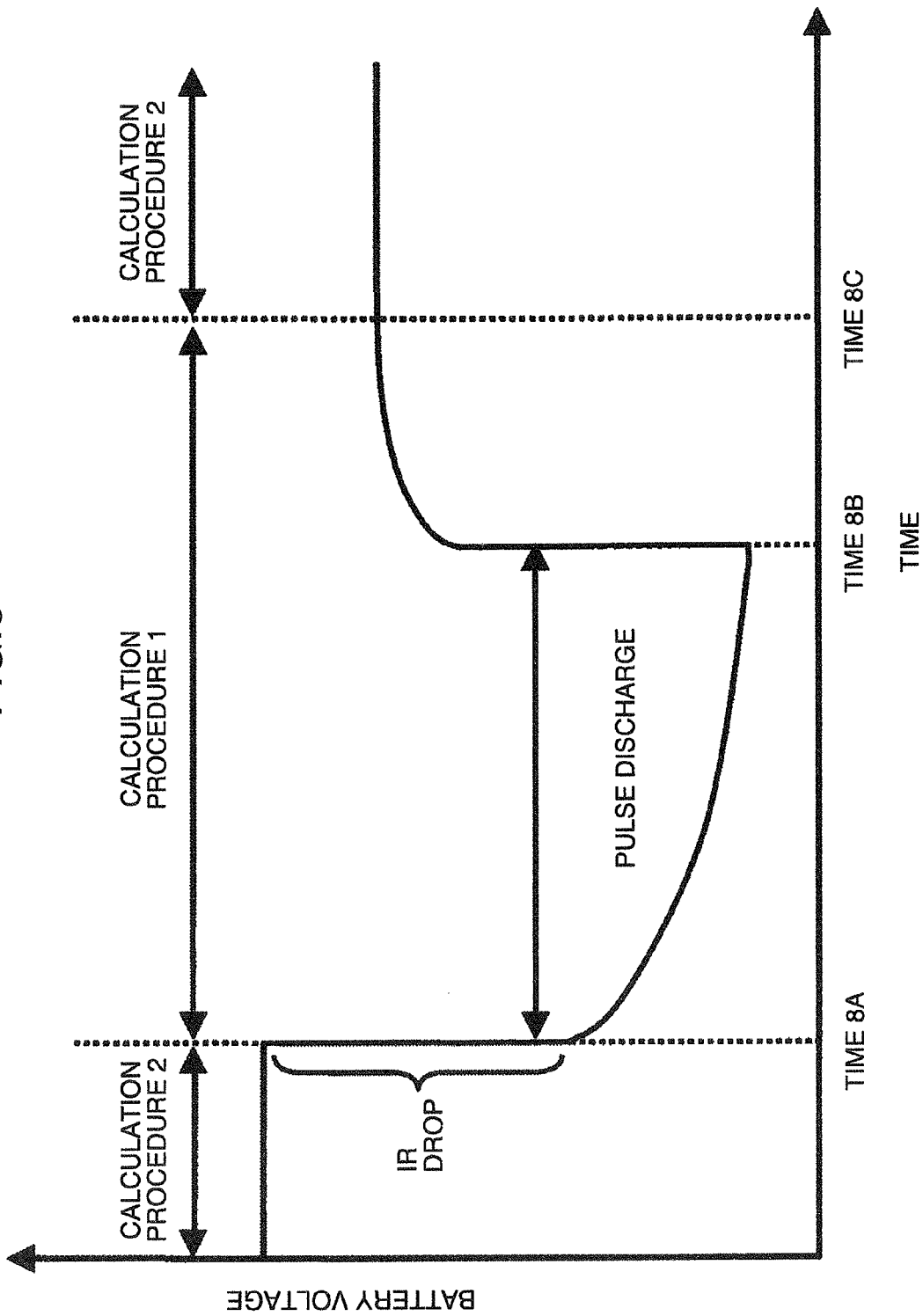

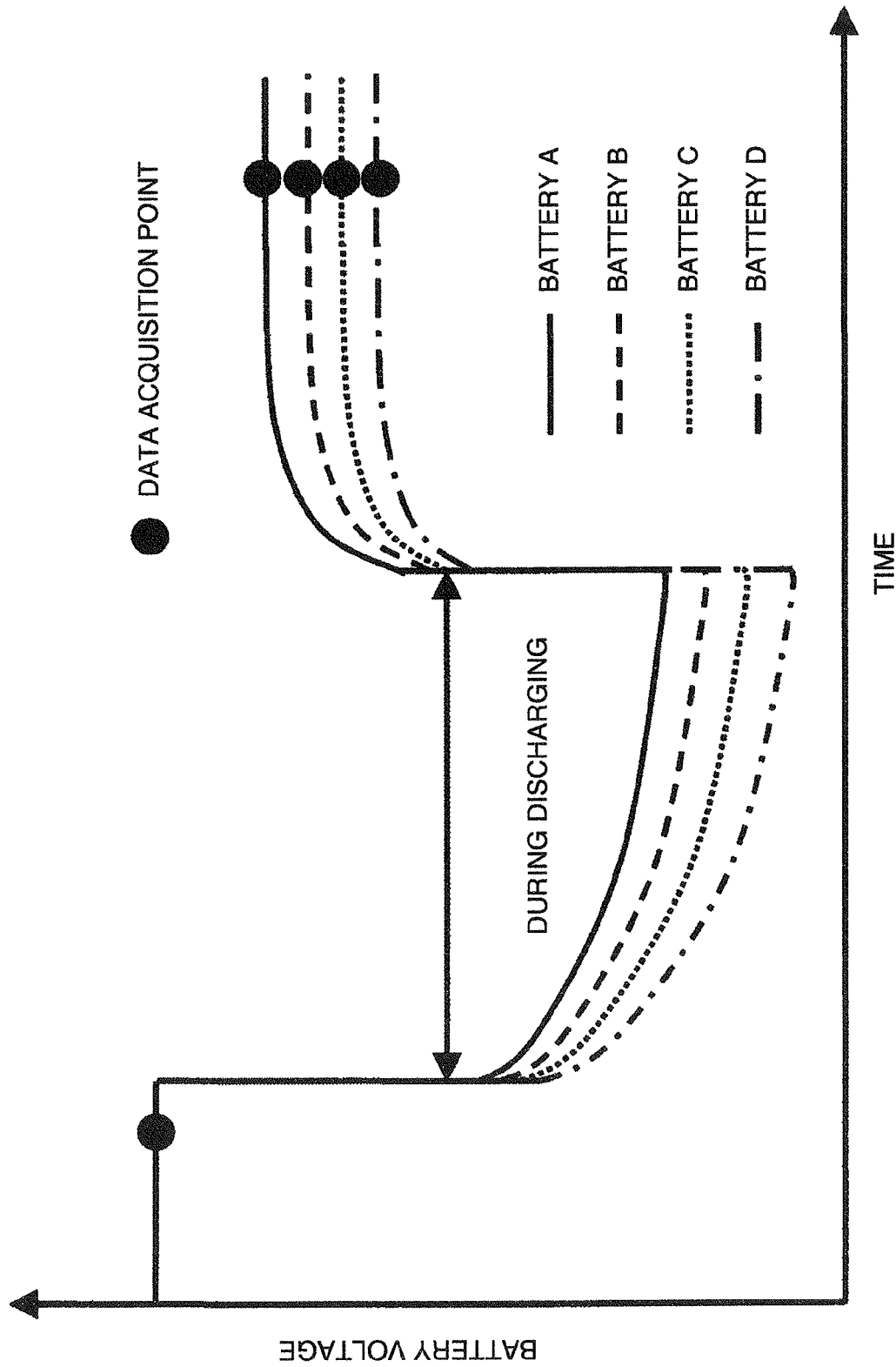

— AVERAGE SOC
--- MAXIMUM SOC
—··— MINIMUM SOC

SOCinit > AVERAGE SOC

— AVERAGE SOC
--- MAXIMUM SOC
—··— MINIMUM SOC

SOCinit < AVERAGE SOC

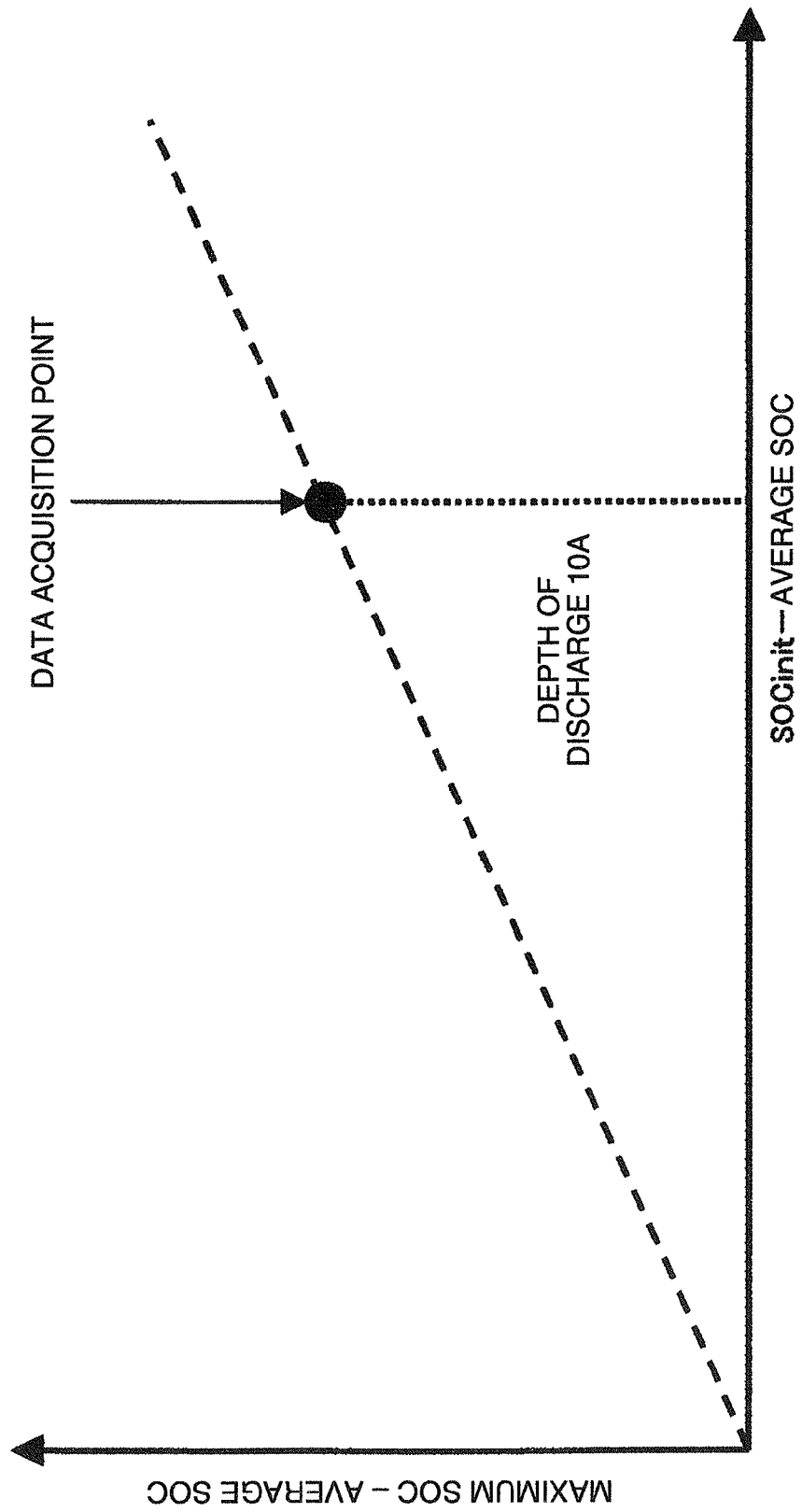

BATTERY IMPEDANCE VERSUS SOC

ALLOWABLE BATTERY CURRENT VERSUS SOC

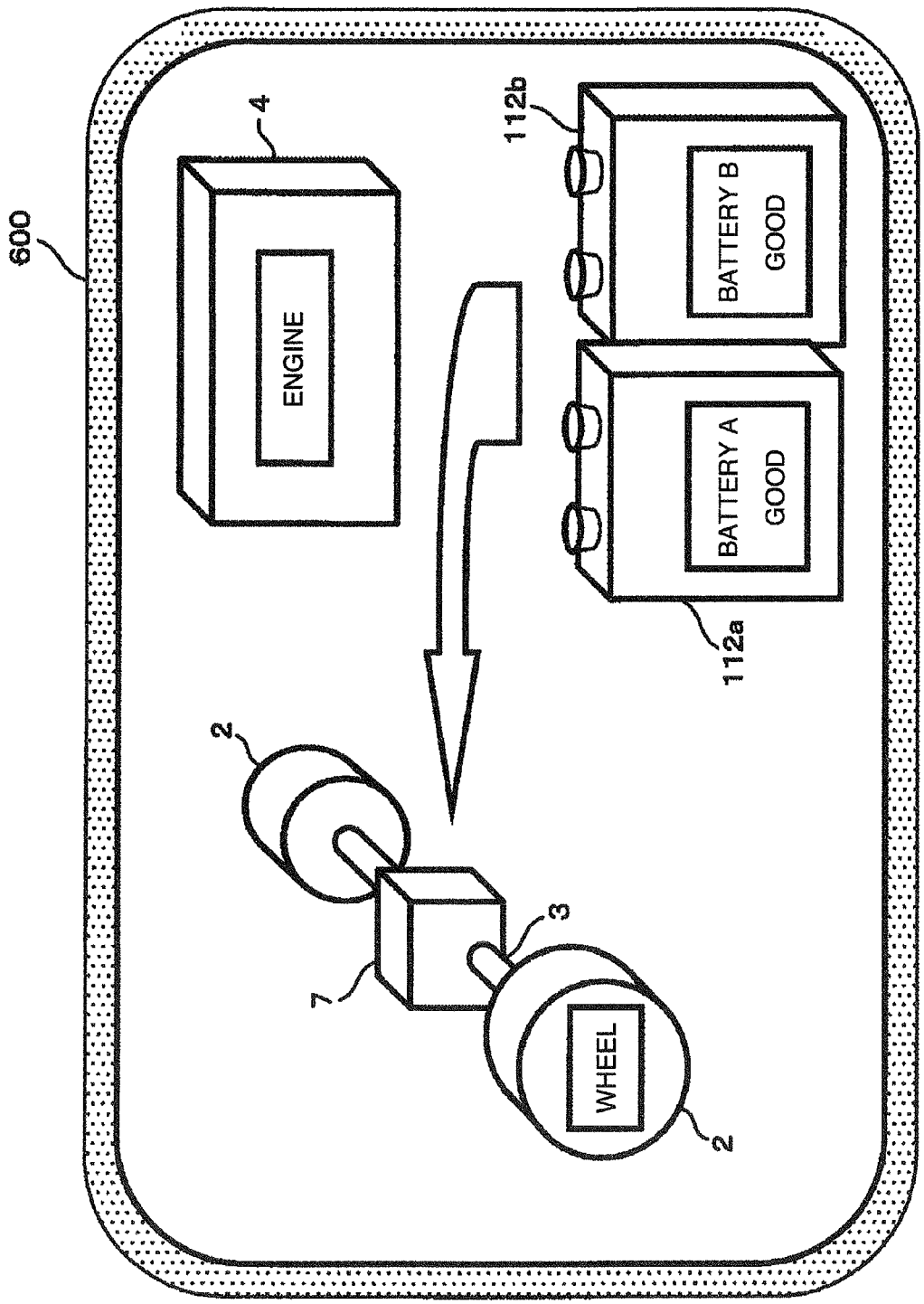

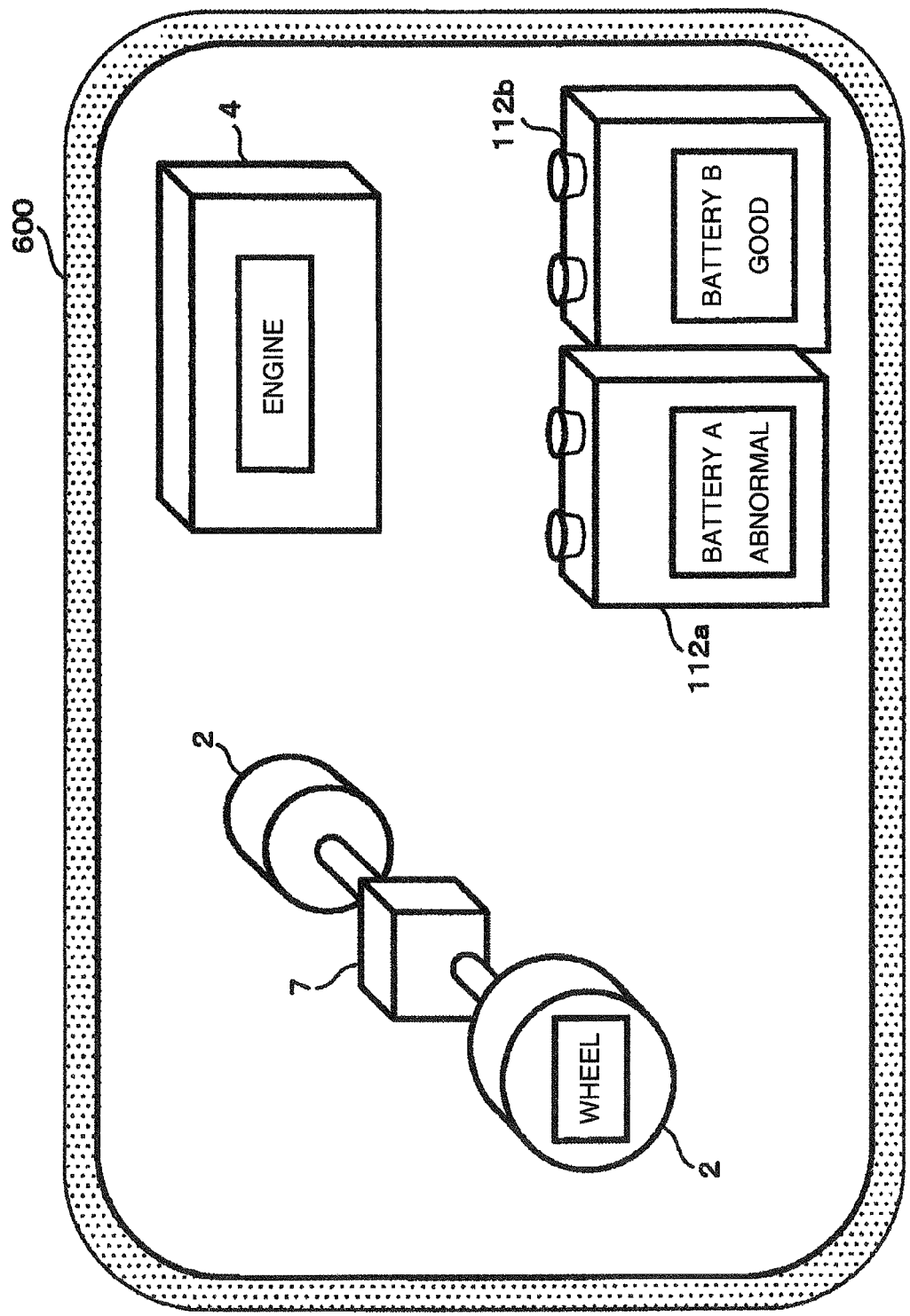

ELECTRIC STORAGE DEVICE

TECHNICAL FIELD

The present invention relates to electric storage devices capable of storing and discharging electrical energy.

BACKGROUND ART

The electric storage device comprises a plurality of electrically connected electric storage elements. There are an individual difference, a difference in degradation, and the like among a plurality of electric storage elements. For this reason, in the background art, e.g., the technique disclosed in Patent Literature 1, an abnormality in a plurality of electric storage elements is detected so as not to be affected by an individual difference, a difference in degradation, or the like among a plurality of electric storage elements. Specifically, from a state where the capacity of each electric storage element is equalized, each electric storage element is discharged by the same amount and a subsequent voltage drop in each electric storage element is detected so as to determine an abnormality of the electric storage element.

CITATION LIST

Patent Literature

PATENT LITERATURE 1 Japanese Patent No. 3975798

SUMMARY OF THE INVENTION

Technical Problem

Most of conventional electric storage devices are adapted not to be affected by an individual difference, a difference in degradation, or the like among a plurality of electric storage elements, as in the technique described in the background art. However, in order to optimally charge and discharge a plurality of electric storage elements, the charging or discharging with respect to the electric storage device needs to be controlled taking into consideration an individual difference, a difference in degradation, and the like among a plurality of electric storage elements, in contrast to the technique described in the background art.

Solution to Problem

According to an aspect of the present invention, there is provided an electric storage device capable of optimally charging and discharging an electric storage unit comprising a plurality of electric storage elements.

An electric storage device of one of the examples according to a typical invention comprises: an electric storage unit including a plurality of electrically connected electric storage elements; a first control unit measuring a state of each of the electric storage elements; a measurement unit measuring a state of the electric storage unit; and a second control unit managing and controlling the state of the electric storage unit, wherein the second control unit captures measurement state information about each of the electric storage elements measured by the first control unit in a no-load state where the electric storage unit is separated from a load, and calculates variation information about the states of charge of the electric storage elements, and wherein based on a plurality of pieces of information including the measurement state information about the electric storage unit and the variation information about the states of charge output from the measurement unit, the second control unit calculates allowable charge and discharge information required for controlling the charging and discharging of the electric storage unit in a loaded state where the electric storage unit is connected to a load and charged or discharged, and outputs the allowable charge and discharge information.

In the example of the present invention having such a feature, the allowable charge and discharge information, on which the variation information about the states of charge of the electric storage elements is reflected, can be output to a device for charging or discharging the electric storage unit.

Advantageous Effects of Invention

According to one of the typical inventions, since the allowable charge and discharge information, on which the variation information about the states of charge of the electric storage elements is reflected, can be output to the device for charging or discharging the electric storage unit, the electric storage unit can be optimally charged or discharged by this charge and discharge device. The electric storage unit can be charged and discharged without either one of the electric storage elements departing from a range between an upper limit state of charge and a lower limit state of charge, which is a use range of the electric storage unit. Other objects, features, and advantages of the present invention will become apparent from the following description of the examples of the present invention in conjunction with the accompanying drawings.

BRIEF DESCRIPTION OF DRAWINGS

FIG. 2 is a block diagram illustrating the detailed configuration of a battery which is the power supply of the electromotive drive unit of FIG. 1.

FIG. 3 is a block diagram illustrating the circuit configuration of a battery management unit constituting a control unit of the battery of FIG. 2.

FIG. 4 is a characteristic chart for illustrating the charging operation of the battery performed by a battery charger illustrated in FIG. 1 and FIG. 2, illustrating temporal changes in the battery voltage versus the charging operation of batteries A, B each having a different state of charge.

FIG. 5 is a characteristic chart for illustrating the charging operation of the battery performed by the battery charger illustrated in FIG. 1 and FIG. 2, illustrating temporal changes of the battery voltage versus the charging operation of the batteries A and B each having a different state of charge.

FIG. 8 is a characteristic chart illustrating temporal changes in the battery voltage when the battery unit of FIG. 2 starts in a no-load state and goes through the states of charge and discharge (load operation state) to the no-load state again, illustrating a relationship between each state of the battery unit and a calculation method of the state of charge of each of a plurality of batteries constituting the battery unit.

FIG. 9 is a characteristic chart illustrating temporal changes in the battery voltage when a plurality of batteries constituting the battery unit of FIG. 2 starts in a no-load state and goes through the states of charge and discharge (load operation state) to the no-load state again, illustrating a relationship between the respective states of the varied battery voltages of the batteries constituting the battery unit and data acquisition points.

FIG. 11 is a characteristic chart illustrating a variation coefficient of the state of charge of the maximum capacity battery during discharging among the variation coefficients of the states of charge of FIGS. 10A, 10B (a ratio between "the maximum state of charge among the states of charge of a plurality of batteries after a vehicle travels minus the average state of charge of the batteries after the vehicle travels" and "the average SOC of the equalized batteries before the vehicle travels minus the average state of charge of the batteries after the vehicle travels"), illustrating an example of calculating the variation coefficient of the state of charge of the maximum capacity battery during discharging, with a data acquisition point set at a point when the battery is discharged to a depth of discharge 10A.

FIG. 13 is a plan view illustrating a display screen installed in a vehicle interior of the plug-in hybrid electric vehicle of FIG. 1, illustrating a state where the electrical energy flow of the drive system and the SOH's of a plurality of battery modules constituting the battery unit of FIG. 2 are displayed.

FIG. 14 is a plan view illustrating the display screen installed in the vehicle interior of the plug-in hybrid electric vehicle of FIG. 1, illustrating a state where the electrical energy flow of the drive system and the SOH's of a plurality of battery modules constituting the battery unit of FIG. 2 are displayed.

DESCRIPTION OF EMBODIMENTS

Figure 1:
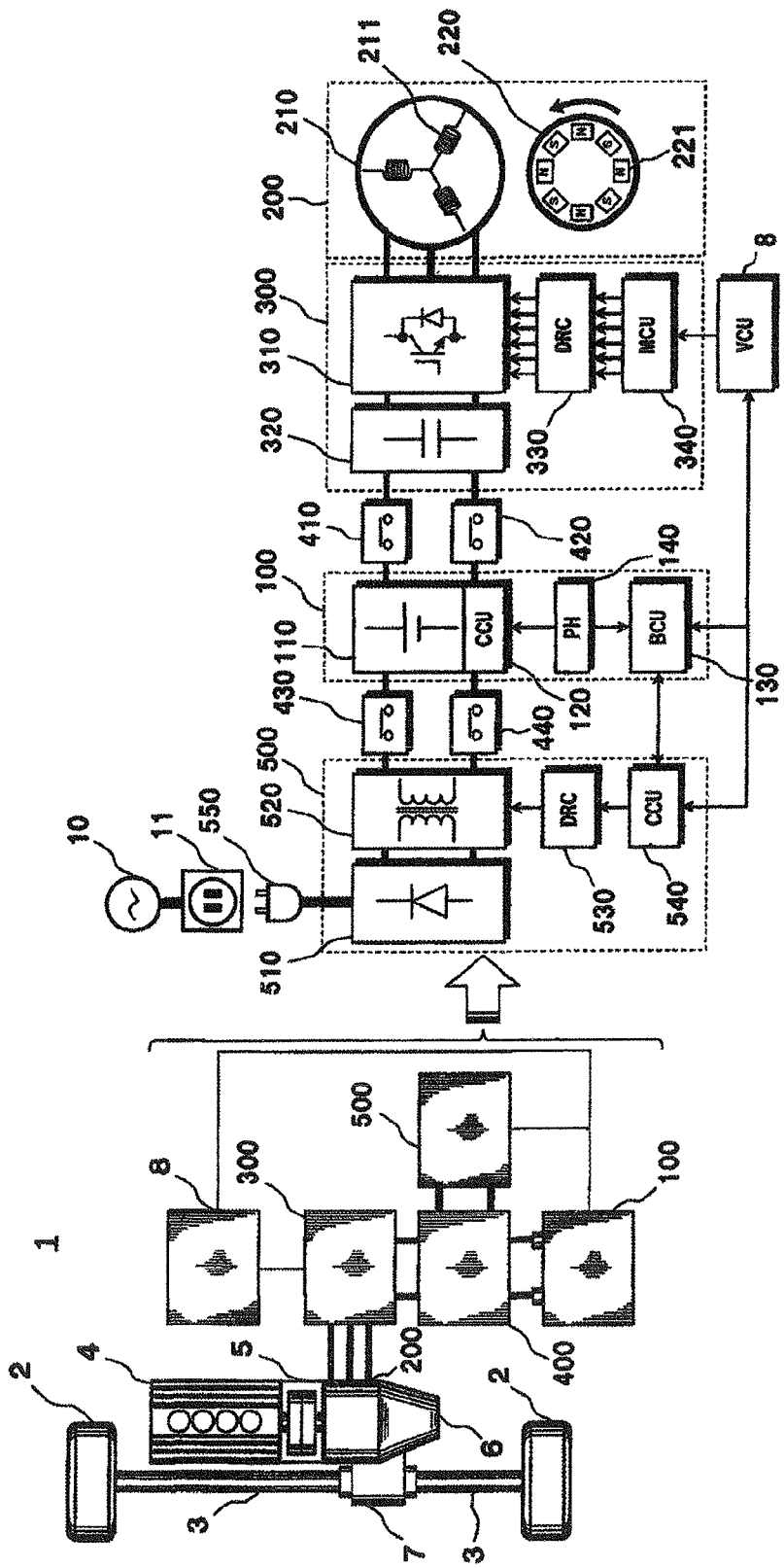
FIG. 1 is a block diagram illustrating the entire configuration of a drive system of a plug-in hybrid electric vehicle which is a first example of the present invention, and the electrical connection configuration of an electromotive drive unit which is a part thereof.

The examples of the present invention will be described based on the accompanying drawings.

In the examples described below, the present invention will be described taking, as an example, the case where the present invention is applied to an electric storage device constituting the power supply of a plug-in hybrid electric vehicle. The electrical energy stored in the electric storage device is used as the electric power for starting an engine, as the electric power for driving a car audio, such as a radio, a car navigation system, and the electric components, such as a light, and as the electric power for driving an electromotive drive unit causing the plug-in hybrid electric vehicle to travel, respectively. The accumulation of electrical energy into the electric storage device is made by the regenerative electric power generated by the regenerative operation of the electromotive drive unit or by the electric power supplied from a household commercial power supply, or by the electric power purchased in a charge station.

The configurations of the examples described below can be also applied to the electric storage device constituting the power supplies of other electric vehicles: e.g., passenger cars, such as a hybrid vehicle and a pure electric vehicle; rail vehicles, such as a hybrid electric train; trucks, such as a hybrid track; buses, such as a hybrid bus; and industrial vehicles, such as a construction machine and a fork lift truck.

Moreover, the configuration of the examples described below can be also applied to other industrial electric storage devices, such as an electric power storage device, a household electric storage device, and an electric storage device for a backup power supply.

As the electric storage element constituting the electric storage device, a lithium ion battery is taken as an example and described. As the electric storage element, other electric storage elements, such as a lead battery, a nickel-hydrogen battery, an electrical double layer capacitor, and a hybrid capacitor, can be also used.

In the electric storage element, an allowable current which can be maximally fed in/out, i.e., the so-called maximum allowable charge or discharge current, is determined according to the present state. If the electric storage element is charged or discharged exceeding this maximum allowable charge or discharge current, the voltage of the electric storage element will deviate from a normal control range. For this reason, in order to optimally use the electric storage element, it is necessary to calculate the maximum allowable charge and discharge currents precisely according to the present state of the electric storage element and control the charging and discharging of the electric storage element based on this calculation result. One of the states of the electric storage element determining the maximum allowable charge and discharge currents is an SOC (state of charge) of the electric storage element. The higher the SOC, the smaller the maximum allowable charge current becomes and the larger the maximum allowable discharge current becomes, respectively. The lower the SOC of the electric storage element, the smaller the maximum allowable discharge current becomes and the larger the maximum allowable charge current becomes, respectively. Moreover, another one of the states of the electric storage element determining the maximum allowable charge and discharge currents are an SOH (state of health) of the electric storage element. When the electric storage element is brand new (when the SOH is small), the maximum allowable charge and discharge currents are large, and as the degradation of the electric storage element proceeds (the SOH increases), the maximum allowable charge and discharge currents decrease. Moreover, the maximum allowable charge and discharge currents also vary with the battery temperature.

Therefore, a control unit is provided in the electric storage device. The control unit detects the state of the electric storage element, and detects in real time the present SOC, SOH, and the like of the electric storage element from this detected state of the electric storage element and calculates the maximum allowable charge and discharge currents. Furthermore, with the maximum allowable charge and discharge currents as command values to a battery charger, the control unit outputs a signal corresponding to the command values to control the charging and discharging of the electric storage element so that the electric storage element can be charged and discharged within a performance range of the electric storage element.

An automotive electric storage device comprises an electric storage unit having a large number of electric storage elements electrically connected in series so that a large electric power required for driving the automobile can be charged and discharged. Since there is an individual difference or a difference in degradation among a large number of electric storage elements electrically connected in series, this individual difference or difference in degradation needs to be taken into consideration in order to detect the present SOC, SOH, and the like of the electric storage element and precisely calculate the maximum allowable charge and discharge currents in the automotive electric storage device. However, so far, most of the conventional automotive electric storage devices are adapted not to be affected by an individual difference or a difference in degradation among a large number of electric storage elements.

Then, in the examples described below, the degree of the individual difference among a large number of electric storage elements is detected and the detected result is reflected, as a coefficient, on the charge and discharge control. Thus, the above-described problem can be solved and the electric storage unit comprising a plurality of electric storage elements can be optimally charged or discharged. Accordingly, in the examples described below, an electric storage device capable of optimally charging and discharging an electric storage unit comprising a plurality of electric storage elements can be provided. Moreover, according to the examples described below, an electric storage device with a control configuration which is required in optimally charging and discharging an electric storage unit comprising a plurality of electric storage elements can be provided.

Note that other than the above described ones, there are technical problems and the configurations or methods for solving the problem. These will be described in the examples below.

Embodiment 1

A first embodiment is described based on FIG. 1 to FIG. 15.

First, the configuration of a drive system of a plug-in hybrid electric vehicle 1 including a battery 100 is described using FIG. 1.

FIG. 1 illustrates the configuration of the drive system of the plug-in hybrid electric vehicle 1 and the electrical connection configuration of the respective components of an electromotive drive unit constituting a part of the drive system.

In FIG. 1, thick solid lines indicate a heavy current system and narrow solid lines indicate a light electric current system.

The plug-in hybrid electric vehicle (hereinafter, referred to as the "PHEV") 1 includes a parallel hybrid drive system.

In the parallel hybrid drive system, an engine 4 which is an internal combustion engine and a motor generator 200 are disposed in parallel, in terms of an energy flow, to a driving wheel 2 (structurally, the engine 4 and the motor generator 200 are mechanically connected in series via a clutch 5 which is a power transmission control mechanism), so that the driving of the driving wheel 2 by a rotational driving force of the engine 4, the driving of the driving wheel 2 by a rotational driving force of the motor generator 200, and the driving of the driving wheel 2 by the rotational driving forces of the both the engine 4 and the motor generator 200 can be achieved. That is, the parallel hybrid drive system comprises: an engine drive unit using the engine 4 as the driving power source, the engine drive unit being mainly used as the driving source of the PHEV 1; and an electromotive drive unit using motor generator 200 as the driving power source, the electromotive drive unit being mainly used as the driving source of the PHEV 1 and as the electric power generation source of the PHEV 1.

As a hybrid system, there is the so-called "series hybrid system", wherein the energy flow from the engine to the driving wheel is in series, i.e., an electric power generator is driven using the rotational driving force of the engine which is an internal combustion engine, and with the use of the electric power generated by this driving, the motor generator is driven, and with the use of the rotational driving force generated by this driving, the driving wheel is driven. Moreover, as the hybrid system, there is a series parallel hybrid system which is a combination of the above-described parallel hybrid system and series hybrid system (the system, wherein an engine and two motor generators are mechanically connected to each other using a power transmission mechanism, such as a planetary gear mechanism, so that a part of the rotational driving force of the engine can be distributed to the motor generator for electric power generation to cause the motor generator to generate electric power, and with the use of the obtained electric power the motor generator for driving can be driven). In this embodiment, the parallel hybrid drive system is taken as an example and described, however the electric storage device of this embodiment described below may be applied to the electric storage device of the other hybrid driving systems described above.

An axle 3 is pivotally supported by a front part or rear part of a non-illustrated car body. A pair of driving wheels 2 is provided at the both ends of the axle 3. Although not illustrated, an axle having a pair of trailing wheels provided at both ends thereof is pivotally supported by a rear part or front part of the car body. In the PHEV 1, a front-wheel drive system with the driving wheels 2 as the front wheels and with the trailing wheels as the rear wheels is employed. As the drive system, a rear-wheel drive system or a four-wheel drive system (a system, wherein one of the front and rear wheels is driven by the engine drive unit and the other one is driven by the electromotive drive unit) may be employed.

A differential gear (hereinafter, referred to as a "DEF") 7 is provided in the center of the axle 3. The axle 3 is mechanically connected to the output side of the DEF 7. The output axis of a transmission 6 is mechanically connected to the input side of the DEF 7. The DEF 7 is a differential power distribution mechanism for distributing the rotational driving force, which is shifted and transmitted by the transmission 6, to the right and left axles 3. The output side of the motor generator 200 is mechanically connected to the input side of the transmission 6. The output side of the engine 4 is mechanically connected to the input side of the motor generator 200 via the clutch 5 which is a power transmission control mechanism. The clutch 5 is controlled so as to be in a connected state when the rotational driving force of the engine 4 is transmitted to the driving wheel 2 or be in a separated state when the rotational driving force of the engine 4 is not transmitted to the driving wheel 2.

Note that the motor generator 200 and the clutch 5 are contained inside a housing of the transmission 6.

The motor generator 200 is a rotating electric machine including: an armature (a stator in this embodiment) 210 with an armature coil 211; and a rotor 220 with a permanent magnet 221 for generating a magnetic field, the rotor 220 being disposed opposite to the armature 210 via a gap, and serves as a motor during power running and as a generator during power generation (during regeneration), respectively.

When the motor generator 200 serves as the motor (i.e., when the motor generator 200 is in a drive mode in which a rotational driving force is needed, such as, during the power running of the PHEV 1 or when the engine 4 is started), the electrical energy stored in the battery 100 is supplied to the armature coil 211 via an inverter device 300. Thus, the motor generator 200 generates the rotational driving force (mechanical energy) by a magnetic action between the armature 210 and a field magnet 220, and outputs this rotational driving force. During the power running of the PHEV 1, the rotational driving force output from the motor generator 200 is transmitted to the axle 3 via the transmission 6 and DEF 7 to drive the driving wheel 2, while during the start-up of the engine 4, the rotational driving force is transmitted to the engine 4 via the clutch 5 to crank the engine 4.

When the motor generator 200 serves as the generator (i.e., when it is in a drive mode in which electric power generation is needed, such as during regeneration, such as during the deceleration or braking of the PHEV 1, or when the battery 100 needs to be charged during the traveling of PHEV 1), the mechanical energy (rotational driving force) transmitted from the driving wheel 2 or engine 4 is transmitted to the motor generator 200 and the motor generator 200 is driven. When the motor generator 200 is driven in this manner, a voltage is induced to the armature coil 211 by a magnetic action between the armature 210 and the field magnet 220. Thus, the motor generator 200 generates an electric power and outputs this electric power. The electric power output from the motor generator 200 is supplied to the battery 100 via the inverter device 300. Thus, the battery 100 is charged.

The driving of the motor generator 200 is controlled by controlling the electric power between the armature 210 and the battery 100 by the inverter device 300. That is, the inverter device 300 is the control unit of the motor generator 200. The inverter device 300 is a power converter which converts electric power from DC to AC or from AC to DC by the switching operation of a switching semiconductor device. The inverter device 300 includes: a power module 310; a driver circuit 330 for driving the switching semiconductor device mounted in the power module 310; an electrolytic capacitor 320 for smoothing the DC voltage, the electrolytic capacitor 320 being electrically connected in parallel to the DC side of the power module 310; and a motor control unit 340 which generates a switching command for the switching semiconductor device of the power module 310 and outputs a signal corresponding to this switching command to the driver circuit 330.

The power module 310 is a structure, wherein six switching semiconductor devices are mounted on a substrate and electrically connected using connection conductors, such as an aluminum wire so that two switching semiconductor devices (of the upper arm and the lower arm) are electrically connected in series and three phases of series circuits (each series circuit for one phase of arm circuit) are electrically connected in parallel (three-phase bridge connection) to configure a power inverter circuit.

As the switching semiconductor device, a metal oxide semiconductor field effect transistor (MOSFET) or an insulated gate bipolar transistor (IGBT) is used. Here, since a parasitic diode is present between the drain electrode and the source electrode when the power inverter circuit is constructed using MOSFETs, there is no need to separately mount a diode therebetween. On the other hand, since a diode is not present between the collector electrode and the emitter electrode when the power inverter circuit is constructed using IGBTs, there is a need to electrically connect a diode in anti-parallel therebetween, separately.

The opposite side (the collector electrode side, in the case of IGBT) of the lower arm connection side of each upper arm is led from the DC side of the power module 310 to the outside and electrically connected to the positive electrode side of the battery 100. The opposite side (the emitter electrode side, in the case of IGBT) of the upper arm connection side of each lower arm is led from the DC side of the power module 310 to the outside and electrically connected to the negative electrode side of the battery 100. The midpoint of each arm, i.e., the connection point between the lower arm connection side (the emitter electrode side of the upper arm, in the case of IGBT) of the upper arm and the upper arm connection side (the collector electrode side of the lower arm, in the case of IGBT) of the lower arm, is led from the AC side of the power module 310 to the outside and electrically connected to a coil of the corresponding phase of the armature coil 211.

The electrolytic capacitor 320 is a smoothing capacitor for suppressing a voltage variation caused by a high speed switching operation of the switching semiconductor device and an inductance parasitic to the power inverter circuit, i.e., for removing an AC component contained in the DC-component. As the smoothing capacitor, a film capacitor may be used in place of the electrolytic capacitor 320.

The motor control unit 340 is an electronic circuit device which, upon receipt of a torque command signal output from a vehicle control unit 8 managing the control of the whole vehicle, generates a switching command signal (e.g., a PWM (pulse width modulation) signal) with respect to six switching semiconductor devices and outputs the same to the driver circuit 330. The motor control unit 340 is configured by mounting a plurality of electronic components including an arithmetic processing unit, such as a microcomputer, on a circuit board, and is disposed in an inverter housing thermally isolated from the power module 310.

The driver circuit 330 is an electronic circuit device which, upon receipt of a switching command signal output from the motor control unit 340, generates drive signals with respect to six switching semiconductor devices and outputs the same to the gate electrodes of six switching semiconductor devices. The driver circuit 330 is configured by mounting a plurality of electronic components, such as a switching semiconductor device and an amplifier, on a circuit board and is disposed near the power module 310 (e.g., the upper part of the case of the power module 310).

The vehicle control unit 8, based on a torque request from a driver and a plurality of state parameters indicating the operation status of the vehicle, such as a vehicle speed, generates a motor torque command signal with respect to the motor control unit 340 and an engine torque command signal with respect to an engine control unit (not illustrated), respectively, and outputs the respective torque command signals to the corresponding control units.

Note that, the engine control unit is an electronic device which controls the driving of an air throttle valve, a fuel injection valve, intake and exhaust valves, and the like which are the components of the engine 4, and generates a drive command signal of each component based on the engine torque command signal obtained from the output signal of the vehicle control unit 8 and outputs each drive command signal to the driver circuit of each component.

The battery 100 is an electric storage device: constituting a power supply for driving the motor generator 200; having a high voltage of the nominal output voltage equal to or greater than 200 V; and having a higher capacity than the conventional hybrid-vehicle driving battery. The battery 100 is electrically connected to the inverter device 300 and a battery charger 500 via a junction box 400. As the battery 100, a lithium ion battery is used. The detailed configuration of the battery 100 will be described later.

In the case of a plug-in mode in which the battery 100 is charged from a household commercial power supply 10 or a power supply unit of a charging station, a power plug 550 at the end of a power cable electrically connected to an external power supply connection terminal of the battery charger 500 is inserted into an outlet 11 on the commercial power supply 10 side, or a power cable extending from the power supply unit of a charging station is connected to the external power supply connection terminal of the battery charger 500 to electrically connect the battery charger 500 to the commercial power supply 10 or power supply unit of the charging station. Thus, an Ac power is supplied to the battery charger 500 from the commercial power supply 10 or from the power supply unit of a charging station. The battery charger 500 converts the supplied AC power to a DC power and adjusts the DC power to the charge voltage of the battery 100, and then supplies the charge voltage to the battery 100. Thus, the battery 100 is charged.

Note that, in this embodiment, a case where the household commercial power supply 10 and the battery charger 500 are electrically connected to each other to charge the battery 100 is taken as an example and described, however, the charging from the power supply unit of a charging station is also performed in a manner basically similar to the charging from the household commercial power supply 10. However, the current capacity supplied to the battery charger 500 and the charge time differ between the charging from the household commercial power supply 10 and the charging from the power supply unit of a charging station. The current capacity of the charging from the power supply unit of a charging station is larger than the charging from the household commercial power supply 10, and the charge time of the former is faster than the latter, i.e., fast charging is possible in the former.

The battery charger 500 is a power converter which converts an AC power supplied from the household commercial power supply 10 to a DC power and boosts up this converted DC power to the charge voltage of the battery 100 and supplies this charge voltage to the battery 100. The battery charger 500 comprises an AC/DC converter circuit 510, a booster circuit 520, a driver circuit 530, and a charge control unit 540, as main component devices.

The AC/DC converter circuit 510 is a power converter circuit which converts the AC power supplied from an external power supply to a DC power and outputs this DC power. The AC/DC converter circuit 510 includes: a rectifier circuit including a plurality of diodes in a bridge connection, the rectifier circuit being provided for rectifying an AC power supplied from an external power supply to a DC power: and a power factor correction circuit electrically connected to the DC side of the rectifier circuit, the power factor correction circuit being provided for improving the power-factor of the output of the rectifier circuit. As the circuit for converting an AC power to a DC power, a circuit including a plurality of switching semiconductor devices in a bridge connection, each switching semiconductor device having a diode connected in anti-parallel thereto, may be used.

The booster circuit 520 is a power converter circuit for boosting up a DC power output from the AC/DC converter circuit 510 (power factor correction circuit) to the charge voltage of the battery 100, and includes an insulated type DC-DC converter, for example. The insulated type DC-DC converter includes: a transformer; a converter circuit electrically connected to the primary coil of the transformer, the converter circuit including a plurality of switching semiconductor devices in a bridge connection and converting a DC power output from the AC/DC converter circuit 510 to an AC power and inputting the AC power to the primary coil of the transformer; a rectifier circuit electrically connected to the secondary coil of the transformer, the rectifier circuit including a plurality of diode devices in a bridge connection and rectifying an AC power generated on the secondary coil of the transformer to a DC power; a smoothing reactor electrically connected in series to the positive electrode side of the output side (DC side) of the rectifier circuit; and a smoothing capacitor electrically connected in parallel between the positive electrode and negative electrode on the output side (DC side) of the rectifier circuit.

The charge control unit 540 is an electronic circuit device which, in order to control the start and end of the charging of the battery 100 performed by the battery charger 500 and control the electric power, voltage, current and the like supplied from the battery charger 500 to the battery 100 during charging, receives a signal output from the vehicle control unit 8 or a signal output from the control unit of the battery 100, and generates a switching command signal (e.g., a PWM (pulse width modulation) signal) with respect to a plurality of switching semiconductor devices of the booster circuit 520 and outputs the same to the driver circuit 530. The charge control unit 540 includes a plurality of electronic components including an arithmetic processing unit, such as a microcomputer, mounted on a circuit board.

The vehicle control unit 8 monitors the voltage on the input side of the battery charger 500, for example. When it is determined that both the battery charger 500 and the external power supply are electrically connected to each other and a voltage is applied to the input side of the battery charger 500 and that the battery 100 is in a charge start state, the vehicle control unit 8 outputs to the charge control device 540 a command signal for starting the charging. When it is determined based on a battery state signal output from the control unit of the battery 100 that the battery 100 is in a fully-charged state, the vehicle control unit 8 outputs to the charge control device 540 a command signal for terminating the charging. Such operations may be performed by the motor control unit 340 or the control unit of the battery 100, or may be performed by the charge control unit 540 itself in cooperation with the control unit of the battery 100.

The control unit of the battery 100 detects the state of the battery 100, calculates the allowable charge amount of the battery 100, and outputs a signal related to this calculation result to the battery charger 500 so that the charging from the battery charger 500 to the battery 100 can be controlled.

The driver circuit 530 is an electronic circuit device which, upon receipt of a torque command signal output from the charge control device 540, generates drive signals with respect to a plurality of switching semiconductor devices of the booster circuit 520, and outputs the drive signals to the gate electrodes of the switching semiconductor devices, respectively, The driver circuit 530 includes a plurality of electronic components, such as a switching semiconductor device and an amplifier, mounted on a circuit board.

Note that, when the AC/DC converter circuit 510 includes a switching semiconductor device, from the charge control device 540 a switching command signal with respect to the switching semiconductor device of the AC/DC converter circuit 510 is output to the driver circuit 530, and from the driver circuit 530 a drive signal with respect to the switching semiconductor device of the AC/DC converter circuit 510 is output to the gate electrode of the switching semiconductor device of the AC/DC converter circuit 510, so that the switching of the switching semiconductor device of the AC/DC converter circuit 510 is controlled.

Inside the junction box 400, first and second positive electrode side relays 410, 430 and first and second negative electrode side relays 420, 440 are contained.

The first positive electrode side relay 410 is a switch for controlling the electrical connection between the DC positive electrode side of the inverter device 300 (power module 310) and the positive electrode side of the battery 100. The first negative electrode side relay 420 is a switch for controlling the electrical connection between the DC negative electrode side of the inverter device 300 (power module 310) and the negative electrode side of the battery 100. The second positive electrode side relay 430 is a switch for controlling the electrical connection between the DC positive electrode side of the battery charger 500 (booster circuit 520) and the positive electrode sides of the battery 100. The second negative electrode side relay 440 is a switch for controlling the electrical connection between the DC negative electrode side of the battery charger 500 (booster circuit 500) and the negative electrode sides of the battery 100.

The first positive electrode side relay 410 and the first negative electrode side relay 420 are closed in a drive mode in which the rotational driving force of the motor generator 200 is required or in a drive mode in which the power generation of the motor generator 200 is required, while when the vehicle is in a stop mode (when an ignition key switch is opened), or when an abnormality occurs in the electromotive drive unit or in the vehicle, or when the battery 100 is charged by the battery charger 500, these relays 410, 420 are opened. On the other hand, the second positive electrode side relay 430 and the second negative electrode side relay 440 are closed when the battery 100 is charged by the battery charger 500, while when the charging of the battery 100 by the battery charger 500 is terminated or when an abnormality occurs in the battery charger 500 or in the battery 100, these relays 430, 440 are opened.

The opening or closing of the first positive electrode side relay 410 and the first negative electrode side relay 420 is controlled by an opening/closing command signal output from the vehicle control unit 8. The opening or closing of the first positive electrode side relay 410 and the first negative electrode side relay 420 may be controlled by an opening/closing command signal output from other control unit, e.g., the motor control unit 340 or the control unit of the battery 100. The opening or closing of the second positive electrode side relay 430 and the second negative electrode side relay 440 is controlled by an opening/closing command signal output from the charge control device 540. The opening or closing of the second positive electrode side relay 430 and the second negative electrode side relay 440 may be controlled by an opening/closing command signal output from other control unit, e.g., the vehicle control unit 8 or the control unit of the battery 100.

As described above, in this embodiment, the first positive electrode side relay 410 and the first negative electrode side relay 420 are provided between the battery 100 and the inverter device 300, and the second positive electrode side relay 430 and the second negative electrode side relay 440 are provided between the first positive electrode side relay 410 and the battery charger 500 so as to control the electrical connection therebetween, respectively. Therefore, a high stability with respect to the high-voltage electromotive drive unit can be secured.

Next, the configuration of the battery 100 is described using FIG. 2 and FIG. 3.

FIG. 2 illustrates the entire configuration of the battery 100. FIG. 3 illustrates the configuration of a battery management unit 121 of the battery 100.

The battery 100 is an electric storage device charged and discharged by the inverter device 300 and the battery charger 500, and mainly includes the battery unit 110 and a control unit.

The battery unit 110 and the control unit are contained in one power-supply housing together with other components including a sensor, a cooling device (e.g., a cooling fan for sending air as a cooling medium to the battery unit 110), a relay, and the like. The power-supply housing is installed under a seat in the vehicle interior, in the trunk room, or under the floor, for example. In the power-supply housing, as with the battery 100, high-voltage electric devices, such as the inverter device 300 and the battery charger 500, may be contained all together. This housing method can facilitate the routing of high voltage cables, reduce inductance due to a reduction in the wiring distance, and reduce the electrical loss.

The battery unit 110 is a storage of electrical energy, and is electrically connected to the inverter device 300 and the battery charger 500.

The control unit is an electronic control unit including a plurality of electronic circuit components. The control unit manages and controls the state of the battery unit 110, and also provides the inverter device 300 and the battery charger 500 with allowable charge and discharge amounts and controls the discharging and storing of electrical energy in the battery unit 110.

The electronic control unit is functionally divided into two hierarchical layers, and includes a battery control unit 130 which corresponds to the upper hierarchical layer (parent) in the battery 100 and a cell control unit 120 which corresponds to the lower hierarchical layer (child) relative to the battery controller 130.

The electronic circuit components constituting the battery control unit 130 and the electronic circuit components constituting the cell control unit 120 are mounted on separate circuit boards, respectively. The circuit board on which the electronic circuit components constituting the cell control unit 120 are mounted is disposed inside the battery unit 110 for the sake of the functionality of the cell control unit 120. The circuit board on which the electronic circuit components constituting the battery control unit 130 are mounted is separately contained inside a case for the control unit, and is disposed near the battery unit 110. When the electronic circuit components constituting the battery control unit 130 and the electronic circuit components constituting the cell control unit 120 are mounted on one common circuit board, this circuit board is contained inside the case for the control unit, and this case is disposed near the battery unit 110.

The battery control unit 130 and the cell control unit 120 are adapted to be ale to transmit/receive a signal with respect to each other through signal transmission lines, but are electrically isolated from each other. This is because the battery control unit 130 and the cell control unit 120 differ in the operating power supply voltage and in the reference potential. That is, this is because the cell control unit 120 uses the battery unit 110 floating from a chassis ground, as its power supply, while the battery control unit 130 uses, as its power supply, a low voltage battery (e.g., a 14V-system battery) for in-vehicle accessories with the chassis ground as the reference potential. For this reason, on the signal transmission line connecting between the battery control unit 130 and the cell control units 120, there is provided an isolator 140, such as a photo coupler, a capacitive coupling device, or a transformer. Thus, the battery control unit 130 and the cell control unit 120 can perform signal transmission using the respective signals each having a different reference potential. The isolator 140 is mounted on the circuit board on which the electronic circuit components constituting the cell control unit 120 are mounted.

The battery unit 110 includes a plurality of lithium ion batteries 111 (hereinafter, may be simply referred to as a "battery 111") capable of storing and discharging an electrical energy (charging or discharging of a DC power). A plurality of batteries 111 is disposed inside a housing case (module case), and is electrically connected in series. Thus, in the battery unit 110, one battery pack is constructed. The battery 111 is the minimum constitutional unit of the battery unit 110, and may be referred to as a single battery or a battery cell. As the shape of the battery 111, either of a cylindrical shape (round pipe shape), a rectangular shape, or a laminate (thin plate) shape may be used. Moreover, as the battery 111, a case where a nominal output voltage of 3.0 to 4.2 V (average nominal output voltage is 3.6 V) is used is taken as an example and described, however other voltage specification may be used.

The batteries 111 are segmented according to a predetermined number of units and are divided into a plurality of battery modules (battery group) 112 for the purpose of managing and controlling their states. In other words, a predetermined number of batteries 111 is electrically connected in series to form one battery module (battery group) 112, and the battery modules 112 are electrically connected in series to form one battery pack. As the predetermined number of units, the batteries 111 may be equally segmented according to the order of their potentials from the highest potential side toward the lowest potential side, for example, such as, four batteries, six batteries, ten batteries, 12 batteries, . . . and so on, or the batteries 111 may be compositely segmented according to the order of their potentials from the highest potential side toward the lowest potential side, for example, such as a combination of four batteries and six batteries, a combination of . . . and so on.

In this embodiment, for simplification of description, a case where the battery pack is constructed by electrically connecting two battery modules 112a, 112b in series, each battery module including four batteries 111 electrically connected in series, is taken as an example and described. In the PHEV 1, actually, approximately 100 to approximately 200 batteries 111 are mounted and electrically connected in series or in series and parallel.

The positive electrode side (the highest potential side) terminal of the battery unit 110 and the DC positive electrode side terminal of the inverter device 300 are electrically connected to each other using a high voltage cable via the first positive electrode side relay 410, while the negative electrode side (the lowest potential side) terminal of the battery unit 110 and the DC negative electrode side terminal of the inverter device 300 are electrically connected to each other using a high voltage cable via the first negative electrode side relay 420. The positive electrode side (the highest potential side) terminal of the battery unit 110 and the DC positive electrode side terminal of the charger 500 are electrically connected to each other using a high voltage cable via the second positive electrode side relay 430, while the negative electrode side (the lowest potential side) terminal of the battery unit 110 and the DC negative electrode side terminal of the charger 500 are electrically connected to each other using a high voltage cable via the second negative electrode side relay 440.

A plurality of temperature sensors (not illustrated) for detecting the temperature of the battery pack is installed in a case having a battery pack contained therein, In this embodiment, with the use of at least four temperature sensors, the temperature of a cooling medium (e.g., air) introduced into the case, the temperature of a cooling medium exhausted from the case, the temperature of the battery 111 in an area exhibiting the highest temperature in a distribution of temperatures of the case, and the temperature of the battery 111 in an area exhibiting the lowest temperature in a distribution of temperatures of the case are measured. The measured temperature information output from each temperature sensor is input to the cell control unit 120 via a signal line, and is also transmitted from the cell control unit 120 to the battery control unit 130 by means of communication via a signal transmission line.

The cell control unit 120 includes a plurality of battery management units 121a, 121b. The battery management units 121a, 121b operate under the control of the battery control unit 130 according to a command signal output from the battery control unit 130, and manage and control the state of each of the batteries 111.

The battery management units 121a, 121b each includes an integrated circuit (IC), and are provided individually corresponding to each of the battery modules 112a, 112b, for example, such as the battery management unit 121 a corresponds to the battery module 112a and the battery management unit 121b corresponds to the battery module 112b, wherein the battery management units 121a, 121b each manage and control the state of each of the batteries 111 constituting the corresponding battery modules 112a, 112b.

A plurality of integrated circuits constituting the cell control unit 120 is mounted on a circuit board together with other components, such as a noise rejection circuit element or a protection circuit element, constituting the cell control unit 120, and furthermore together with the isolator 140 described above. This circuit board is contained inside the case for the control unit, separately, which is disposed at one end inside the case having the battery pack contained therein.

The battery management units 121a, 121b are electrically connected to both the terminals (the positive electrode side terminal and the negative electrode side terminal) of the batteries 111 constituting the corresponding battery modules 112a, 112b through voltage detection wirings 180, respectively. Thus, into each of the battery management units 121a, 121b, the inter-terminal voltage of each of the batteries 111 constituting the corresponding battery modules 112a, 112b is captured. Each captured inter-terminal voltage is selected by a multiplexer 122 which is a selector circuit, and is output to a voltage detector circuit 123. The voltage detector circuit 123 includes a differential amplifier which is a potential converter and an analog-to-digital converter. The selected and output terminal voltage is converted in potential by the differential amplifier, and is converted from an analog value to a digital value by the analog-to-digital converter. The detected terminal voltage is output to the control circuit 124. Thus, the inter-terminal voltage of each of the batteries 111 constituting the corresponding battery modules 112a, 112b is detected. The control circuit 124 includes a memory circuit, and stores each detected inter-terminal voltage therein.

Moreover, into each of the battery management units 121a, 121b, a voltage between the positive electrode side terminal of the battery 111 positioned in the highest potential and the negative electrode side terminal of the battery 111 positioned in the lowest potential, among the batteries 111 connected in series in the corresponding battery modules 112a, 112b, is captured as a voltage for generating the operation voltage (e.g., 3 to 5 V) of an internal circuit (e.g., analog-to-digital converter) of the integrated circuit. In this manner, a voltage between the positive electrode side of the battery 111 positioned in the highest potential and the negative electrode side of the battery 111 positioned in lowest potential is captured to generate the operation voltage of the internal circuit, so that the electric power consumed in the corresponding battery modules 112a, 112b can be equalized and the occurrence of an imbalance among the states of charge of the batteries 111 constituting the corresponding battery modules 112a, 112b can be suppressed.

Furthermore, the battery management units 121a, 121b each use the potential of the negative electrode side terminal of the battery 111 positioned in the lowest potential among the batteries 111 connected in series constituting the corresponding battery modules 112a, 112b, as the reference potential.

A signal input/output circuit 125 is provided in each of the battery management units 121a, 121b. The signal input/output circuit 125 provided in each of the battery management units 121a, 121b is connected in series by the signal transmission circuit 150 according to the order of the reference potentials of the battery management units 121a, 121b (the order of potentials of the battery modules 112a, 112b). That is, the battery management units 121a, 121b are configured so that the output side of the signal input/output circuit 125 of the battery management unit 121a can be connected to the input side of the signal input/output circuit 124 of the battery management unit 121b by the signal transmission circuit 150 and the signal transmission can be performed in an electrically non-isolated manner between the both battery management units 121a, 121b. The output side of the signal input/output circuit of the battery control unit 130 is connected to the input side of the signal input/output circuit 125 of the battery management unit 121a by the signal transmission circuit 150, so that the signal transmission can be performed via the isolator 140 between both the battery control unit 130 and the battery management unit 121a. The input side of the signal input/output circuit of the battery control unit 130 is connected to the output side of the signal input/output circuit 125 of the battery management unit 121b by the signal transmission circuit 150, so that the signal transmission can be performed via the isolator 140 between both the battery control unit 130 and the battery management unit 121b. Thus, a signal output from the battery control unit 130 is transmitted from the output side of the signal input/output circuit of the battery control unit 130 to the input side of the signal input/output circuit 125 of the battery management unit 121 a via the isolator 140. This signal is then transmitted, in a non-insulating state, from the output side of the signal input/output circuit 125 of the battery management unit 121a to the input side of the signal input/output circuit 125 of the battery management unit 121b. This signal is then transmitted from the output side of the signal input/output circuit 125 of the battery management unit 121b to the input side of the signal input/output circuit of the battery control unit 130 via the isolator 140. That is, the battery management units 121a, 121b connected in series in a non-isolating manner and the battery control unit 130 are connected in a loop by the signal transmission circuit. This loop connection may be referred to as the "daisy chain connection", "tie-in-a-row connection", or "in-succession connection".

Note that, in this embodiment, the signal transmission circuit 150, through which a signal output from the battery control unit 130 is transmitted from the battery control unit 130 to the battery management unit 121a of the highest potential and to the battery management unit 121b of the lowest potential in this order and returns to the battery control unit 130 again, i.e., the signal transmission circuit 150, through which a signal is transmitted in one direction from the highest potential toward the lowest potential, is taken as an example and described. However, the signal transmission circuit, through which a signal output from the battery control unit 130 is transmitted from the battery control unit 130 to the battery management unit 121b of the lowest potential and to the battery management unit 121a of the highest potential in this order and returns to the battery control unit 130 again, i.e., the signal transmission circuit, through which a signal is transmitted in one direction from the lowest potential toward the highest potential, may be used. As the signal transmission circuit 150, a signal transmission circuit, through which a signal output from the battery control unit 130 is transmitted from the battery control unit 130 to the battery management unit 121a of the highest potential, to the battery management unit 121b of the lowest potential, and to the battery management unit 121a of the highest potential in this order and returns to the battery control unit 130 again, i.e., a signal transmission circuit, through which a signal is transmitted back and forth, for example, such as a signal goes from the highest potential toward the lowest potential and then folds back from the lowest potential toward the highest potential, may be used. Furthermore, as the signal transmission circuit, a signal transmission circuit, through which a signal output from the battery control unit 130 is transmitted to the battery management unit 121b of the lowest potential, and to the battery management unit 121 a of the highest potential, and to the battery management unit 121b of the lowest potential in this order and returns to the battery control unit 130 again, i.e., a signal transmission circuit, through which a signal is transmitted back and forth, for example, such as a signal goes from the lowest potential toward the highest potential and then folds back from the highest potential toward the lowest potential, may be used.

The signal transmission circuit 150 includes a signal transmission circuit for serial communications which is used in at least two different ways. In this embodiment, as the signal transmission circuit, a signal transmission circuit employing a telecommunication standard compliant with CAN (Controller Area Network) called LIN (Local Interconnect Network) is used.

One signal transmission circuit 150 is a loop transmission circuit for communication command signals 150a through which a communication command signal (i.e., a signal with a plurality of bytes in which a plurality of areas, such as a data area indicating the communication (control) content, are provided) output from the battery control unit 130 is transmitted.

The communication command signal output from the battery control unit 130 via the loop transmission circuit for communication command signals 150a includes a command signal for requesting the transmission of the detected terminal voltage of the battery 111, a command signal for executing the adjustment of the state of charge of the battery 111, a command signal for placing the battery management units 121a, 121b from a sleep state to a wake-up state (i.e., for activating the battery management units 121a, 121b), a command signal for placing the battery management units 121a, 121b from the wake-up state to the sleep state (i.e., for stopping the operation of the battery management units 121a, 121b), a command signal for setting communication addresses of the battery management units 121a, 121b, a command signal for verifying an abnormal content of the battery management units 121a, 121b, and the like.

Another signal transmission circuits 150 is a loop transmission circuit for abnormality signals 150b through which an abnormality test signal output from the battery control unit 130 and an abnormal signal (i.e., one bit signal of high or low level indicative of the presence or absence of an abnormality) output from the battery management units 121a, 121b are transmitted.

The abnormality test signal is output from the battery control unit 130 in order to detect the presence or absence of an abnormality, such as an abnormality of the battery management units 121a, 121b or a disconnection of the signal transmission circuit 150. If there is an abnormality in the battery management units 121a, 121b or in the signal transmission circuit 150, the abnormality test signal of a high level returns to the battery control unit 130 as a low level signal.

The abnormality signal is output from the battery management unit having detected an abnormality, when there is an abnormality in the internal circuit of the battery management units 121a, 121b or when there is an abnormality in the batteries 111 constituting the battery modules 112a, 112b. If the battery management unit 121a detects an abnormality in the internal circuit, or an abnormality (e.g., overcharge) in the battery 111, the battery management unit 121a outputs the abnormality signal of one bit indicative of the presence of an abnormality to the loop transmission circuit for abnormality signals 150b. The abnormality signal output to the loop transmission circuit for abnormality signals 150b is sent to the battery control unit 130 via the battery management unit 121b and the isolator 140. Thus, the battery control unit 130 can promptly recognize the presence or absence of an abnormality and also promptly execute a processing for dealing with abnormalities, such as the prohibition of charging and discharging by opening the relay. Moreover, the battery control unit 130 can promptly notify the presence or absence of an abnormality to the vehicle control unit 8 which is the upper control unit and to the motor control unit 340. The abnormality signal is transmitted when there is an abnormality of the highest level, among a plurality of abnormalities, requiring the charge and discharge inhibition by opening relays.

Subsequently, the battery control unit 130 transmits a command signal for identifying the abnormal matter (the cause) to the battery management unit 121a having output the abnormality signal, via the loop transmission circuit for communication command signals 150a. The battery management unit 121a having output the abnormality signal already has the abnormal content, which was found by abnormality diagnosis, stored in the memory circuit of the control circuit 124. For this reason, the battery management unit 121a having output the abnormality signal reads the information about the abnormal content according to the command signal output from the battery control unit 130, and writes this read information about the abnormal content into a data field of this command signal, and returns this written command signal to the battery control unit 130 via the loop transmission circuit for communication command signals 150a. Upon return of the command signal from the battery management unit 121a having output the abnormality signal, the battery control unit 130, based on the information about the abnormal content written into the returned command signal, identifies this content indicating "what kind of abnormality the battery management unit 121a having output the abnormality signal has detected". The identified abnormal content is transmitted to the vehicle control unit 8 which is the upper control unit and to the motor control unit 340.

Each of the battery management units 121a, 121b has a different reference potential, as described above. For this reason, the potential conversion (level shifting) of a signal is performed between the battery management units 121a, 121b. In this embodiment, the potential conversion (level shifting) is performed on the input side of the signal input/output circuits 125 of each of the battery management units 121a, 121b. Thus, in this embodiment, signal transmission between the battery management units 121a, 121b can be realized by a non-isolation manner, i.e., without providing an expensive isolator such as a photo coupler, and thus a small and inexpensive cell control unit can be provided.

Each of the battery management units 121a, 121b, based on a command signal output from the battery control unit 130 and related to the adjustment of the state of charge, adjusts the state of charge of the battery 111, among the batteries 111 constituting the corresponding battery modules 112a, 112b, requiring the adjustment of the state of charge. For this reason, each of the battery management units 121a, 121b includes a bypass circuit electrically connected in parallel between the respective terminals of the batteries 111 constituting the corresponding battery modules 112a, 112b. The bypass circuit includes a series circuit in which a resistor 126 and a switching semiconductor device 127 are electrically connected in series.

Here, the battery 111 requiring the adjustment of the state of charge refers to the battery 111 in the state of charge higher by a predetermined amount than an average state of charge calculated from the inter-terminal voltages of all the batteries 111. Moreover, the battery control unit 130 calculates the discharge time of the battery 111 requiring the adjustment of the state of charge, and transmits the information about this discharge time, as a command signal, to the battery management units 121a, 121b corresponding to the battery 111 requiring the adjustment of the state of charge, via the signal transmission circuit 150.

Note that, in this embodiment, a case, where the resistor 126 constituting the bypass circuit is provided outside the integrated circuit and the switching semiconductor device 127 constituting the bypass circuit is provided inside the integrated circuit, is taken as an example and described, however, both the resistor 126 and the switching semiconductor device 127 may be provided outside the integrated circuit or may be provided inside the integrated circuit.

The command signal related to the adjustment of the state of charge (related to the discharge time), the command signal being output from the battery control unit 130 and transmitted to the signal input/output circuit 125 via the signal transmission circuit 150, is input from the signal input/output circuit 125 to the control circuit 124. The control circuit 124, based on the input command signal, outputs a turn-on signal of the switching semiconductor device 127 corresponding to the battery 111 requiring the adjustment of the state of charge, to a balancing switch driver circuit 128 of the switching semiconductor device 127. The balancing switch driver circuit 128 receives the turn-on signal output from the control circuit 124, and generates a drive signal of the switching semiconductor device 127 corresponding to the battery 111 requiring the adjustment of the state of charge, and outputs this drive signal to the gate electrode of the switching semiconductor device 127 corresponding to the battery 111 requiring the adjustment of the state of charge. Thus, the switching semiconductor device 127 corresponding to the battery 111 requiring the adjustment of the state of charge turns on.

When the switching semiconductor device 127 associating with the battery 111 requiring the adjustment of the state of charge turns on, the bypass circuit associating with the battery 111 requiring the adjustment of the state of charge is electrically connected to the battery 111 requiring the adjustment of the state of charge. Thus, an electrical closed loop is formed and the battery 111 requiring the adjustment of the state of charge starts discharging. When the battery 111 requiring the adjustment of the state of charge starts discharging, a current output from the battery 111 requiring the adjustment of the state of charge flows into the resistor 126 and is consumed as heat. The turning-on of the switching semiconductor device 127 associating with the battery 111 requiring the adjustment of the state of charge continues for a discharge time specified based on the command signal. Meanwhile, the current output from the battery 111 requiring the adjustment of the state of charge is consumed by the resistor 126 as heat. Thus, the charge amount of the battery 111 requiring the adjustment of the state of charge decreases, so that the battery 111 requiring the adjustment of the state of charge is adjusted so that the state of charge approaches the average state of charge.

The control circuit 124 of each of the battery management units 121*a*, 121*b* includes a circuit for conducting an abnormality diagnosis. The abnormality diagnosis is broadly divided into the following two: an abnormality diagnosis on the battery 111 side, i.e., a diagnosis of whether or not the batteries 111 constituting the battery modules 112*a*, 112*b* corresponding to each of the battery management units 121*a*, 121*b* are overdischarged or overcharged; and an abnormality diagnosis on the cell control unit 120 side including a wiring for voltage detection 180. In the former abnormality diagnosis, the inter-terminal voltage of the battery 111 measured by the above-described voltage detection is compared with an overdischarge threshold value and an overcharge threshold value, and when the inter-terminal voltage is below the overdischarge threshold value, the battery is diagnosed as overdischarged, while when the inter-terminal voltage exceeds the overcharge threshold value, it is diagnosed as overcharged. The latter abnormality diagnosis includes a plurality of diagnoses including: a diagnosis of whether or not there is an abnormality in the internal circuit of the integrated circuit constituting each of the battery management units 121*a*, 121*b*; a diagnosis of whether or not the wiring for voltage detection 180 is disconnected; a diagnosis of whether or not the switching semiconductor device 127 is abnormal; and a diagnosis of whether or not the internal temperature of the integrated circuit is higher than an allowable temperature.

Among these abnormalities, if there is an abnormality of the highest level requiring the charge and discharge inhibition by opening relays, the battery management units 121*a*, 121*b* transmit a signal of one bit indicative of the presence of an abnormality to the battery control unit 130.

To a charge and discharge path between the positive electrode side of the battery unit 110 and the DC positive electrode side of the inverter device 300 (power module 310), a current measurement unit (a current sensor or a current measurement circuit) 170 for detecting a current supplied from the battery unit 110 to the inverter device 300 (power module 310) or a current supplied from the inverter device 300 (power module 310) to the battery unit 110 is electrically connected in series. A measurement signal related to the charge or discharge current of the battery unit 110, the measurement signal being output from the current measurement unit 170, is input to the battery control unit 130. Between the both electrodes of the battery unit 110 (between the positive electrode side and the negative electrode sides), a voltage measurement unit (a voltage sensor or a voltage measurement circuit) 160 for detecting the voltage between the both electrodes of the battery unit 110 is electrically connected in parallel. A measurement signal related to the charge or discharge current of the battery unit 110, the measurement signal being output from the voltage measurement unit 160, is input to the battery control unit 130. Moreover, to the battery control unit 130, detection signals related to the voltages of the batteries 111 detected by the battery management units 121*a*, 121*b* are also input. Although not illustrated, a plurality of temperature measurement units (a sensor, such as a thermistor or a thermocouple, or a temperature measurement circuit) is provided inside the battery unit 110. A measurement signal related to the temperature of the battery 111, the measurement signal being output from the temperature measurement units, is input to the battery control unit 130.

Note that, in this embodiment, a case, where the current measurement unit 170 is provided on the battery unit 110 side of the first positive electrode side relay 410, is taken as an example and described, however the current measurement unit 170 may be provided on the inverter device 300 side of the first positive electrode side relay 410. Moreover, in this embodiment, a case, where the current measurement unit 170 is installed inside the junction box 400, is taken as an example and described, however the current measurement unit 170 may be provided separately from the junction box 400. Furthermore, in this embodiment, a case where the voltage measurement unit 160 is mounted on the circuit board of the battery control unit 130 is taken as an example and described, however the voltage measurement unit 160 may be provided separately from the circuit board of the battery control unit 130. Furthermore, in this embodiment, a case, where signals output from a plurality of temperature measurement units are input to the cell control unit 120 and are further input from the cell control unit 120 to the battery control unit 130 by means of communication via the signal transmission line 150, is taken as an example and described, however these signals may be directly input to the battery control unit 130.

The battery control unit 130 is an electronic control unit which manages and controls the state of the battery unit 110 and also notifies allowable charge and discharge amounts to the vehicle control unit 8 or the motor control unit 340, thereby controlling the feeding in/out of an electrical energy in the battery unit 110. The battery control unit 130 includes a state detection unit 131. The state detection unit 131 is an arithmetic processing unit, such as a microcomputer or a digital signal processor, and is mounted on the circuit board together with other electronic circuit components including a storage device and the like.

A plurality of signals including: the measurement signals output from the current measurement unit 170, the voltage measurement unit 160, and the temperature measurement unit; the detection signals related to the inter-terminal voltages of the batteries 111, the detection signals being output from the cell control unit 120; the abnormality signal output from the cell control unit 120; the ON/OFF signal based on the operation of the ignition key switch; and the signal output from the vehicle control unit 8 which is the upper control unit or from the motor control unit 340, is input to the state detection unit 131. The ON/OFF signal based on the operation of the ignition key switch and the signal output from the vehicle control unit 8 which is the higher control unit or from the motor control unit 340 are input to the battery control unit 130 via a signal transmission circuit called CAN (Controller Area Network) for connecting and transmitting/receiving mutual information between a plurality of control units, such as the battery control unit 130, the vehicle control unit 8, the motor control unit 340, inside the car.

The state detection unit 131, based on a plurality of pieces of information including the information obtained from these input signals, the predetermined characteristic information about the battery 111, and the calculation information required for the calculation, executes a plurality of calculations including the calculations for detecting the state of the battery unit 110 (e.g., the state of charge (hereinafter, referred to as the "SOC") and a state of health (hereinafter, referred to as the "SOH") of the battery unit 110) and the like, the calculation for controlling the battery unit 110, and the calculation for controlling the charge and discharge amounts of the battery unit 110. Then, the state detection unit 131, based on these calculation results, generates and outputs a plurality of signals including a command signal with respect to the cell control unit 120, a signal related to the allowable charge and discharge amounts for controlling the charge and discharge amounts of the battery unit 110, a signal related to the SOC of the battery unit 110, and a signal related to the SOH of the battery unit 110.

Moreover, the state detection unit 131, based on the abnormality signal output from the cell control unit 120, generates and outputs a plurality of signals including a command signal for cutting off the first positive electrode and negative electrode relays 410, 420 and a signal for notifying the abnormal state.

Note that, the detailed description of the calculation processings, such as the calculation of the SOC of the battery unit 110 and each battery 111, the calculation of the SOH of the battery unit 110 and each battery 111, and the calculation of the allowable charge and discharge amounts of the battery unit 110, among the processings performed by the state detection unit 131 will be described later.

Among these output signals, a plurality of output signals including signals related to the allowable charge and discharge amounts (allowable charge and discharge currents or allowable charge and discharge powers), the signal related to SOC, the signal related to SOH, and the signal related to the notification of an abnormal state is output to the vehicle control unit 8 which is the upper control unit or to the motor control unit 340 via an automotive local area network.

The motor control unit 340, upon receipt of the signal related to the allowable charge and discharge amounts output from the battery control unit 130 and the torque command signal output from the vehicle control unit 8, or upon receipt of the torque command signal output from the vehicle control unit 8 taking into consideration the allowable charge and discharge amounts output from the battery control unit 130, controls the switching in the power module 310. Thus, the inverter device 300 charges and discharges the battery unit 110 so that an AC power based on the torque command signal can be supplied to the motor generator 200 within a range of the allowable charge and discharge amounts or so that an AC power which is obtained from the motor generator 200 based on the torque command signal can be converted to a DC power and supplied. That is, the charging and discharging of the battery unit 110 are controlled by the control of the inverter device 300 performed by the battery control unit 130.

The command signal with respect to the cell control unit 120 includes a plurality of signals including a voltage detection command signal of the batteries 111, a command signal for adjusting the state of charge, an abnormality diagnosis command signal, an activation signal for activating the cell control unit 120, a halt signal for halting the cell control unit 120.

The battery control unit 130 includes a leak detector (not illustrated). The leak detector includes a state detection unit 131 (a digital processing unit) and an analog processing unit. The leak detector detects whether or not, between a strong electric system from the battery unit 110 to the motor generator 200 and the chassis ground serving as the reference potential of a weak electric system, a leak due to an electric connection therebetween occurs.

The leak detection method includes two methods: one referred to as an AC method and the other referred to as a DC method. In the AC method, an AC waveform (e.g., a square waveform) is injected from the state detection unit 131 to a capacitive coupling device (a coupling capacitor) electrically connected to the positive electrode side or negative electrode side of the battery unit 110, and a digital value of a response waveform obtained by this injection is compared with a threshold value to detect the presence or absence of a leak. In the DC method, an insulation resistance corresponding to the digital value of a voltage obtained from a first resistance voltage-divider circuit electrically connected between the positive electrode of the battery unit 110 and the chassis ground and an insulation resistance corresponding to the digital value of a voltage obtained from a second resistance voltage-divider circuit electrically connected between the negative electrode of the battery unit 110 and the chassis ground are calculated, and whether or not a ratio of these insulation resistances is in a range of predetermined threshold values is determined to detect the presence or absence of the leak.

To the state detection unit 131, an analog value related to the response waveform or a voltage processed and obtained in the analog processing unit of the leak detector is input. The state detection unit 131 converts this analog value to a digital value using an analog-to-digital converter, and compares this digital value with a predetermined leak determination threshold value to determine whether or not a leak has been detected. Upon detection of a leak, the state detection unit 131 notifies this information to the vehicle control unit 8 or the motor control unit 340.

To the battery control unit 130, as described above, a signal output from the ignition key switch is input. The signal output from the ignition key switch is used as a signaling as the activation or stop of the battery 100.

When the ignition key switch is turned on, in the battery control unit 130 a power supply circuit operates based on the output signal from the ignition key switch, and a driving voltage is applied from this power supply circuit to a plurality of electronic circuit components to operate the electronic circuit components. Thus, the battery control unit 130 is activated. Upon activation of the battery control unit 130, an activation command signal is output from the battery control unit 130 to the cell control unit 120 via the signal transmission circuit 150. In the cell control unit 120, based on the activation command signal output from the battery control unit 130, the power supply circuits of the battery management units 121a, 121b sequentially operate and the battery management units 121a, 121b are sequentially activated. Thus, the cell control unit 120 is activated. Upon activation of the cell control unit 120, a predetermined initial processing is executed, and if there is no abnormality in the battery 100, then the vehicle control unit 8 closes the first positive electrode side and negative electrode side relays 410, 420 according to a command signal output from the battery control unit 130 via the automotive local area network. Thus, the battery 100 is electrically connected to the inverter device 300, and the charging and discharging are started.

The examples of the predetermined initial processing include the measurement of the voltages of the batteries 111, the abnormality diagnosis of the internal circuits of the batteries 111 and the battery management units 121a, 121b, the measurement of the voltage, current, and temperature of the battery unit 110, the calculation of the SOC of the battery 100, the calculation of the SOH of the battery 100, the calculation of the allowable charge and discharge amounts of the battery 100, and the like.

When the ignition key switch is turned off, the vehicle control unit 8 cuts off the first positive electrode side and negative electrode side relays 410, 420 according to the command signal output from the battery control unit 130 via the automotive local area network. Thus, the battery 100 is electrically disconnected from the inverter device 300, and the charging and discharging are terminated. Subsequently, a stop command signal is output from the battery control unit 130 to the cell control unit 120 via the signal transmission circuit 150. When the cell control unit 120 receives the stop command signal, the power supply circuits of the battery management units 121a, 121b sequentially stop after a predetermined termination processing is executed. Thus, the battery management units 121a, 121b sequentially stop, and the cell control unit 120 stops. When the cell control unit 120 stops and the communication cannot be performed between the battery control unit 130 and the cell control unit 120, in the battery control unit 130 the operation of the power supply circuit will stop and the operation of the electronic circuit components will stop. Thus, the battery control unit 130 stops.

The examples of the predetermined termination processing include the measurement of the voltages of the batteries 111, the adjustment of the states of charge of the batteries 111, and the like.

To the battery 100, a battery (not illustrated) of a voltage lower than that of the battery 100 is electrically connected. This low voltage battery is a lead battery of a nominal output voltage 12 V, which is an operating power supply for in-vehicle accessories, such as a light and an audio, and an electronic control unit, and is electrically connected to the battery 100 via a non-illustrated DC-DC converter. The DC-DC converter is a power converter for converting a DC power to a DC power with a voltage stepped up/down to a predetermined voltage.

Next, a method of charging the battery unit 110 by the battery charger 500 is described using FIG. 4 and FIG. 5.

FIG. 4 and FIG. 5 illustrate the method of charging two batteries A, B each having a different SOC (when SOC of the battery A>SOC of the battery B).

FIG. 4 illustrates an example of the charge control when a consumption current value of the resistor 126 determined by the resistance value of the resistor 126 which the battery management unit 121 includes and the inter-terminal voltage value of the battery 111 is compared with the charge current value of the battery charger 500, and as a result the both are equal or the consumption current value of the resistor 126 is larger than the charge current value (consumption current value≥charge current value). FIG. 5 is an example of the charge control when the consumption current value of the resistor 126 is smaller than the charge current value (consumption current value<charge current value).

In the case of FIG. 4, when the batteries A, B are charged, the battery A first reaches an upper limit voltage at a time 4A. At this time, the battery charger 500 continues to charge the batteries A, B electrically connected in series. Moreover, the balancing switch 127 corresponding to the battery A is closed and the resistor 126 is electrically connected in parallel to the battery A. Thus, the charge current value of the battery charger 500 coincides with the consumption current value of the battery A in parallel connection with the resistor 126, and the charging and discharging of the battery A can be balanced. Therefore, the SOC of the battery A will not rise any more. Subsequently, only the battery B is charged and the SOC of the battery B will rise toward the upper limit voltage. When the charging in this state continues and the SOC of the battery B reaches the upper limit voltage, the SOCs of the batteries A, B are equalized.

In the case of FIG. 5, when the batteries A, B are charged, the battery A first reaches the upper limit voltage at a time 5A. At this time, the battery charger 500 stops to charge the batteries A, B electrically connected in series. Subsequently, at a time 5B, the balancing switch 127 corresponding to the battery A is closed and the resistor 126 is electrically connected in parallel to the battery A. Thus, the battery A of a high SOC discharges, and a current due to this discharge flows through the resistor 126 and is consumed there. Accordingly, the SOC of the battery A decreases. Subsequently, when the SOCs of the batteries A, B are equalized, the balancing switch 127 corresponding to the battery A is opened and the discharging of the battery A is halted. Subsequently, at a time 5C, the charging of the batteries A, B is resumed. Thus, the SOCs of the batteries A, B rise again.

Note that, in this embodiment, a case, where the charge control is performed as described above using the battery charger 500 and the battery management unit 121, is taken as an example and described, however, if there is another unit which can charge the battery unit 110 and in addition equalize the SOCs of the batteries 111 constituting the battery unit 110, this unit may be used. Moreover, in this embodiment, a case, where the SOCs of the batteries 111 are equalized while charging the battery unit 110, has been taken as an example and described, however the battery management unit 121 may be operated alone so as to equalize the SOCs of the batteries 111.

Figure 6A:
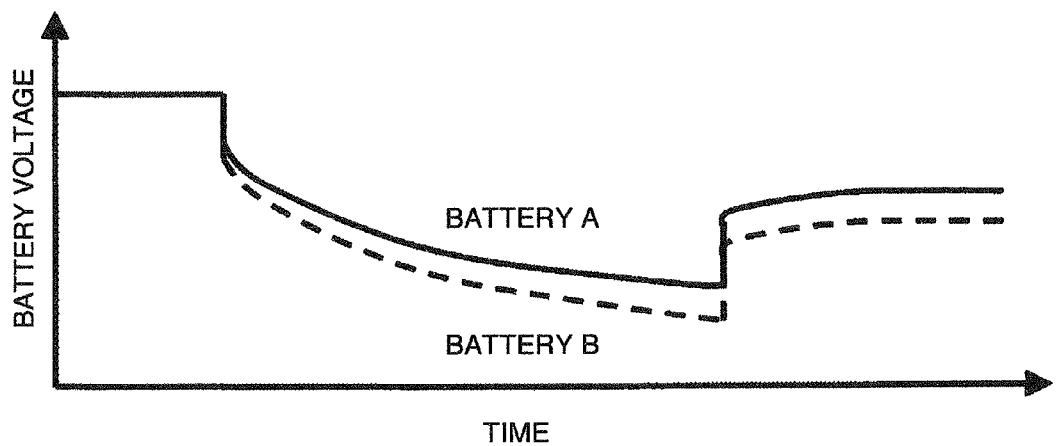
FIG. 6A is a characteristic chart illustrating temporal changes in the battery voltage when a battery unit of FIG. 2 starts in a no-load state and goes through the states of charge and discharge (load operation state) to the no-load state again, illustrating the fact that the battery voltage varies according to an individual difference and a variation in degradation when the batteries A, B are charged and discharged from a state where the batteries A, B each having an individual difference and a variation in degradation are equalized.
Figure 6B:
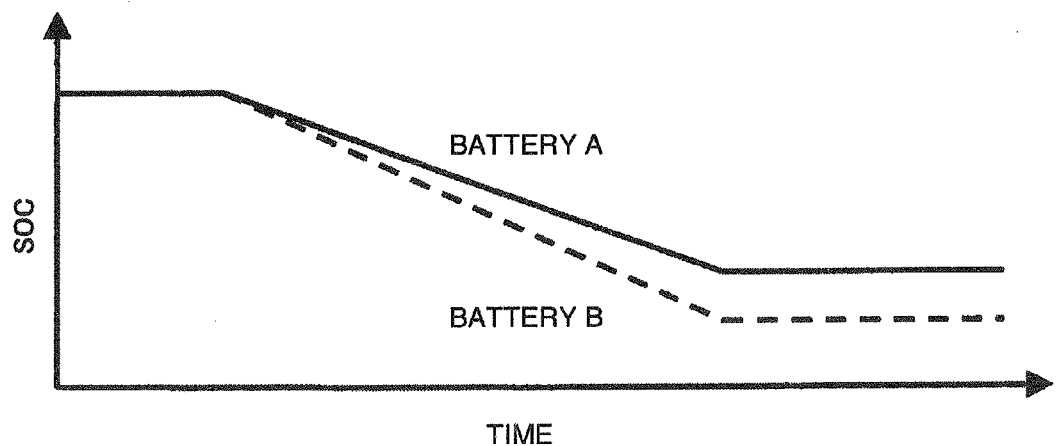
FIG. 6B is a characteristic chart illustrating temporal changes in the state of charge (SOC) when the battery unit of FIG. 2 starts in a no-load state and goes through the states of charge and discharge (load operation state) to the no-load state again, illustrating the fact that the state of charge varies according to an individual difference and a variation in degradation when the batteries A, B are charged and discharged from a state where the batteries A, B each having an individual difference and a variations in degradation are equalized.

As illustrated in FIG. 4 and FIG. 5, the battery unit 110 is charged to a high SOC by the battery charger 500, and the SOCs of the batteries 111 are equalized by the battery management unit 121. However, in the case where there is an individual difference or a variation in degradation among the capacities when the batteries 111 constituting the battery unit 110 are fully charged, if the SOC of the battery unit 110 decreases due to the subsequent traveling of PHEV 1, then the voltages and SOCs of the equalized batteries 111 vary again as illustrated in FIGS. 6A, 6B. In order to reliably charge and discharge the battery unit 110, it is necessary to obtain the variation information about the voltages or SOCs of the batteries 111 caused by an individual difference or a variation in degradation among the batteries 111 and reflect the obtained variation information on the charge and discharge control of the battery unit 110.

Next, the charge and discharge control method taking into consideration a variation of the voltages or SOCs of the batteries 111 based on an individual difference or a variation in degradation among the batteries 111 is described, but prior to this description the processing content related to the basic state-detection performed by the state detection unit 131 is described. The typical processing content of the battery unit 110 performed by the state detection unit 131 includes the calculation of the SOC of the battery unit 110, the calculation of the SOH of the battery unit 110, the calculation of the maximum allowable charge and discharge currents or maximum charge and discharge powers currently chargeable and dischargeable, the abnormality detection, and the like.

First, a method of detecting the SOC of the battery unit 110 performed by the state detection unit 131 is described. The SOC of the battery unit 110 can be calculated from Formulas (1) and (2) below based on the measurement information about the battery unit 110.

$$OCV = CCV - I \times R - Vp \quad (1)$$

$$SOC = MAP(OCV) \quad (2)$$

OCV: electromotive force of the battery unit 110

CCV: inter-terminal voltage of the battery unit 110 obtained from a measurement signal of the voltage measurement unit 160

Figure 7:
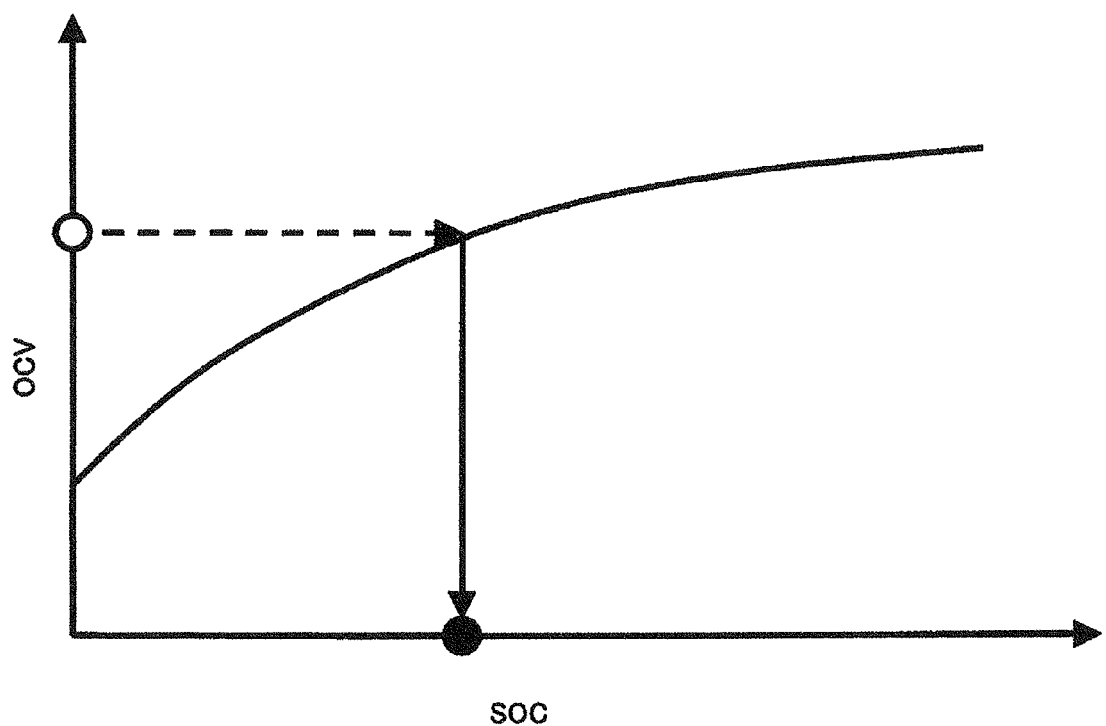
FIG. 7 is a characteristic chart used in calculation of the state of charge of the battery unit of FIG. 2, illustrating a relationship between the electromotive force and the state of charge of the battery unit.

I: current of the battery unit 110 which is obtained from a measurement signal of the current measurement unit 170 during no load or during charging or discharging R: internal resistance of the battery unit 110, which is calculated in advance and stored into the state detection unit 131 or is calculated in real time Vp: polarization voltage That is, the OCV of the battery unit 110 is first calculated according to Formula (1), and then as illustrated in FIG. 7, from a data table (map) showing a relationship between the preliminarily extracted OCV and SOC of the battery unit 110, the SOC can be obtained according to Formula (2).

Note that, in this embodiment, as the respective OCV, CCV, R, and Vp, the OCV, CCV, R, and Vp of the battery unit 110 are used. However, the respective average values of the OCV, CCV, R, and Vp of the batteries 111 divided by the number of the batteries 111 constituting the battery unit 110 may be used. In this case, for R and Vp, a value per unit of battery 111 is used. Moreover, R and Vp may be data-tabulated (mapped) or functionalized as the values corresponding to all the conditions, such as the SOC, temperature, charging side, and discharge side of the battery 111, so that this table or function may be provided in the appropriate control unit. This would reduce the error in the OCV of Formula (1) and accordingly reduce the error in the SOC of Formula (2) with the OCV of Formula (1) as a parameter.

The method of calculating SOC by the state detection unit 131 includes a calculation method using Formula (3) below, other than the calculation method using Formulas (1), (2).

$$SOC = SOC0 + 100 \times \int I dt / Q \quad (3)$$

SOC0: initial value of SOC

Q: capacity of the battery 111 when fully charged

I: current of the battery unit 110 obtained from the measurement signal of the current measurement unit 170

R, Vp, Q, and the like indicative of the characteristics of the battery 111 used by the state detection unit 131 are reflected on the calculation taking into consideration the degradation information about the battery 111, so that the SOC can be detected with high accuracy.

Note that, in the description hereinafter, the result of the SOC of the battery unit 110, which is detected according to Formulas (1), (2) or Formula (3) using the measurement information obtained from measurement signal of the voltage measurement unit 160, the current measurement unit 170, or the like, is referred to as SOCmodule. When a vehicle system is activated and a normal operation is started, the SOCmodule is updated at a control period corresponding to a request from the vehicle system.

In order to charge and discharge the battery unit 110 taking into consideration a variation in the voltages or SOCs of the batteries 111 due to an individual difference or a variation in degradation among the batteries 111, the SOC needs to be detected for each of the batteries 111 constituting the battery unit 110. The SOC of each of the batteries 111 can be calculated from Formulas (1), (2) or Formula (3) using the inter-terminal voltage information about each of the batteries 111 transmitted from the battery management unit 121 and the current information obtained from the measurement signal of the current measurement unit 170. However, when the calculations according to Formulas (1), (2) or Formula (3) are executed for each of the batteries 111, the calculation processing becomes enormous. Moreover, with regard to R, Vp, Q, and the like, the calculation needs to be performed corresponding to an individual difference or a variation in degradation present in each of the batteries 111, and therefore their calculation processings are added to the calculation processing according to Formulas (1), (2) or Formula (3), and the calculation processing further increase.

Then, in this embodiment, a control logic is constructed so that the charge and discharge control of the battery unit 110 taking into consideration a variation in the voltages or SOCs of the batteries 111 due to an individual difference or a variation in degradation among the batteries 111 can be easily realized with as smallest calculation processing (load) as possible.

FIG. 8 illustrates a relationship between the state of the battery unit 110 and a method of calculating the SOC of each of the batteries 111.

As shown in FIG. 8, when the battery 111 is in the state of discharge (pulse discharge as an example, in FIG. 8) (from a time 8A to a time 8B) and when the battery 111 is within a predetermined time after the discharge is terminated (from a time 8B to a time 8C), the CCV of the battery 111≠OCV of the battery 111. For this reason, in order to obtain the SOC of the battery 111, the calculation needs to be performed using Formulas (1), (2) or Formula (3) (a calculation procedure 1). On the other hand, when the battery unit 110 is in a no-load state (up to the time 8A) and when a sufficient time has elapsed after the charging and discharging are terminated (at a time 8C and thereafter), the CCV of the battery 111 is equal to the OCV of the battery 111 (CCV=OCV). For this reason, in order to obtain the SOC of the battery 111, the calculation can be performed using only Formula (2) (a calculation procedure 2).

Then, in this embodiment, the detection of the SOC of each of the batteries 111 constituting the battery unit 110 is conducted only before the vehicle travels or after the vehicle travels (after the charging and discharging of the battery 110 are terminated and after a predetermined time has elapses). During no load (when the first positive electrode side and negative electrode side relays 410, 420 are cut off (OFF)) represented by before or after the vehicle travels, the SOC of each of the batteries 111 can be easily detected. Whether or not it is before the vehicle travels or after the vehicle travels is determined by determining, based on the value of a current obtained from the measurement signal of the current measurement unit 170, whether or not the battery unit 110 is electrically conducted. However, this may be determined based on the vehicle-speed information, the output signal of the ignition key switch, or the like.

Note that, in this embodiment, an acquisition timing of the SOC of each of the batteries 111 is a timing before the vehicle travels or after the vehicle travels, however other timing at which the no-load state and CCV=OCV can be ensured may be used.

FIG. 9 illustrates a change in the battery voltage CCV of each of the batteries 111 constituting the battery unit 110.

Here, a case where four batteries 111 (battery A to battery D) are electrically connected in series is taken as an example and described.

As illustrated in FIG. 9, even if the SOCs (battery voltages) of four batteries 111 are equalized before the vehicle travels, as the SOC of the battery unit 110 decreases due to discharging, a variation in the SOCs (battery voltages) occurs again according to the respective individual differences and variations in degradation among four batteries 111. Such a phenomenon similarly occurs during charging, as well.

Then, in this embodiment, before a vehicle with four batteries 111 whose SOCs are equalized travels and after the battery unit 110 charges and discharges and the traveling of the vehicle is terminated, the SOCs of four batteries 111 are actually measured, respectively. Then, using the SOCs of four batteries 111 obtained after the vehicle travels, a variation extent (variation coefficient) of the SOC of the battery unit 110 is calculated.

Here, the average SOC, the maximum SOC, and the minimum SOC when the number of series batteries 111 is N (a positive integer) are given by Formulas (4) to (6) below when expressed using SOC ($SOC_1$, $SOC_2$, ..., $SOC_N$) of N batteries 111 actually measured after the vehicle travels.

$$\text{Average SOC} = (SOC_1 + SOC_2 + \ldots + SOC_N)/N \quad (4)$$

$$\text{Maximum SOC} = \text{MAX}(SOC_1, SOC_2, \ldots, SOC_N) \quad (5)$$

$$\text{Minimum SOC} = \text{MIN}(SOC_1, SOC_2, \ldots, SOC_N) \quad (6)$$

Figure 10A:
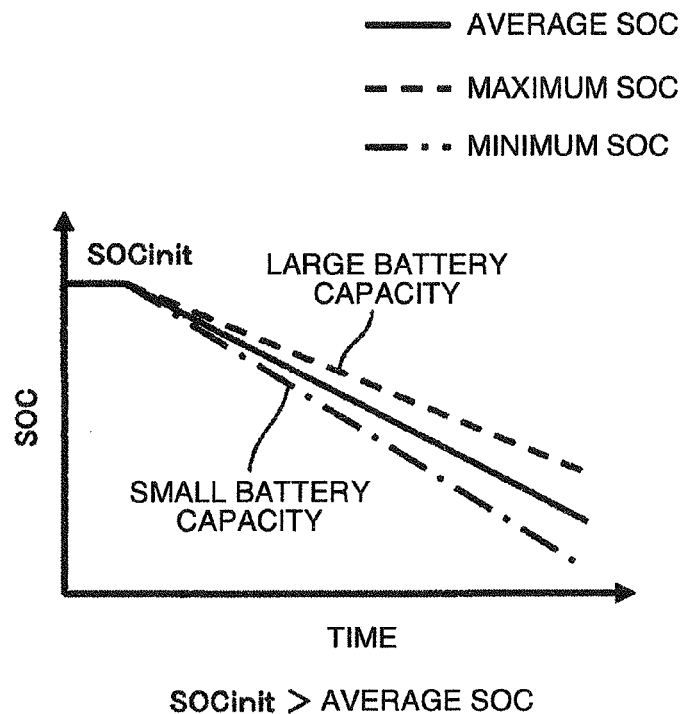
FIG. 10A is a characteristic chart illustrating temporal changes in the states of charge of a plurality of batteries constituting the battery unit of FIG. 2, illustrating a relationship between the average state of charge of the batteries during discharging (when the state of charge decreases) and the respective states of charge of the maximum capacity battery and the minimum capacity battery among the batteries.
Figure 10B:
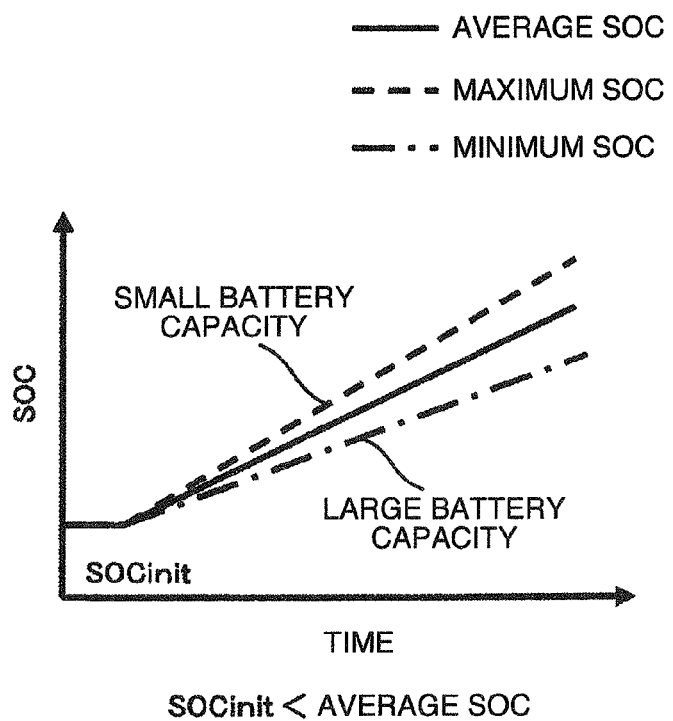
FIG. 10B is a characteristic chart illustrating temporal changes in the states of charge of a plurality of batteries constituting the battery unit of FIG. 2, illustrating a relationship between the average state of charge of the batteries during charging (when the state of charge increases), and the respective states of charge of the maximum capacity battery and the minimum capacity battery among the batteries.

Next, with reference to FIGS. 10A, 10B, a method of calculating a variation coefficient $\Delta SOC1$ of the SOC of the battery 111 of the maximum battery capacity and a variation coefficient $\Delta SOC2$ of the SOC of the battery 111 of the minimum battery capacity, among the variation coefficients of the SOC of the battery 111, is described.

Here, the average SOC of equalized N batteries 111 before the vehicle travels is denoted by SOCinit.

As illustrated in FIG. 10A, when SOCinit of 70% drops to 30% after the vehicle travels (SOCinit>average SOC), the SOC of the battery 111 of the largest battery capacity among N batteries 111 does not drops immediately, thus resulting in the maximum SOC. Then, the variation coefficient $\Delta SOC1$ of the SOC of the battery 111 of the largest battery capacity is given by Formula (7) using the maximum SOC and average SOC as parameters. On the other hand, among N batteries 111, the SOC of the battery 111 of the smallest battery capacity immediately drops, thus resulting in the minimum SOC. Then, the variation coefficient $\Delta SOC2$ of the SOC of the battery 111 of the smallest battery capacity is given by Formula (8) using the minimum SOC and average SOC as parameters.

$$\Delta SOC1 = (\text{maximum SOC} - \text{average SOC})/|\text{SOCinit} - \text{average SOC}| \quad (7)$$

$$\Delta SOC2 = (\text{average SOC} - \text{minimum SOC})/|\text{SOCinit} - \text{average SOC}| \quad (8)$$

Moreover, as illustrated in FIG. 10B, when the SOC of 30% before the vehicle travels rises to 70% after the vehicle travels (SOCinit<average SOC), the SOC of the battery 111 of the largest battery capacity does not rise immediately, thus resulting in the minimum SOC. Then, the variation coefficient $\Delta SOC1$ of the SOC of the battery 111 of the largest battery capacity is given by Formula (9) using the minimum SOC and average SOC as parameters. On the other hand, the SOC of the battery 111 of the smallest battery capacity immediately rises, thus resulting in the maximum SOC. Then, the variation coefficient $\Delta SOC2$ of the SOC of the battery 111 of the smallest battery capacity is given by Formula (10) using the maximum SOC and average SOC as parameters.

$$\Delta SOC1 = (\text{average SOC} - \text{minimum SOC})/|\text{SOCinit} - \text{average SOC}| \quad (9)$$

$$\Delta SOC2 = (\text{maximum SOC} - \text{average SOC})/|\text{SOCinit} - \text{average SOC}| \quad (10)$$

The calculated $\Delta SOC1$ and $\Delta SOC2$ are stored into a storage unit, such as a memory built-in or external to the state detection unit 131. Accordingly, when the vehicle travels next time, $\Delta SOC1$ and $\Delta SOC2$ stored in this storage unit are read and used.

Note that, after the vehicle travels, in order to reliably calculate the variation coefficients $\Delta SOC1$ and $\Delta SOC2$ of SOC after a predetermined time elapses, the charging of the battery unit 110 performed by the battery charger 500 is preferably prohibited until the calculation processing is terminated. In contrast, when a priority is desired to given to the charging of the battery unit 110 performed by the battery charger 500, the calculation of the variation coefficients $\Delta SOC1$ and $\Delta SOC2$ of SOC is interrupted. In this case, the calculation of the variation coefficients $\Delta SOC1$ and $\Delta SOC2$ of SOC is executed during no-load next time.

Moreover, after the vehicle travels, the vehicle may be started to travel again before a predetermined time elapses. Also in this case, similarly, a waiting time is set until the calculation of the variation coefficients $\Delta SOC1$ and $\Delta SOC2$ of SOC is terminated, or the calculation of the variation coefficients $\Delta SOC1$ and $\Delta SOC2$ of SOC is interrupted.

The variation coefficients $\Delta SOC1$ and $\Delta SOC2$ of SOC calculated as described above are used to predict whether or not there is any SOC deviating from the average SOC and how much it deviates from the average SOC. That is, as illustrated in FIG. 11, if the variation coefficients $\Delta SOC1$ and $\Delta SOC2$ of SOC are used, e.g., if Formula (7) is used, then from the measurement result of the variation of SOC occurring when the battery unit 110 is discharged to a certain depth of discharge 10A, it is possible to easily predict a variation occurring when the discharge further proceeds.

When the battery unit 110 is charged and discharged during traveling of the vehicle, the average SOC (SOCmodule) of the battery unit 110 is detected using the measurement information obtained from measurement signals of the voltage measurement unit 160, the current measurement unit 170, and the like. For this reason, among the SOCs of the batteries 111 when the charging and discharging of the battery unit 110 further proceed, the maximum SOC and the minimum SOC can be predicted as a predicted maximum SOC and a predicted minimum SOC based on the detected average SOC (SOCmodule) and the variation coefficients $\Delta SOC1$ and $\Delta SOC2$ of SOC according to Formulas (7) to (10).

Here, when the SOC which varies as the vehicle travels is in the state of SOCinit>SOCmodule, the predicted maximum SOC and the predicted minimum SOC are given by Formulas (11), (12).

$$\text{Predicted maximum SOC} = \text{SOCmodule} + \Delta \text{SOC1} \times |\text{SOCinit} - \text{SOCmodule}| \quad (11)$$

$$\text{Predicted minimum SOC} = \text{SOCmodule} - \Delta \text{SOC2} \times |\text{SOCinit} - \text{SOCmodule}| \quad (12)$$

On the other hand, when the SOC varying as the vehicle travels is in the state of SOCinit<SOCmodule, the predicted maximum SOC and the predicted minimum SOC are given by Formulas (13), (14).

$$\text{Predicted maximum SOC} = \text{SOCmodule} + \Delta \text{SOC2} \times |\text{SOCinit} - \text{SOCmodule}| \quad (13)$$

$$\text{Predicted minimum SOC} = \text{SOCmodule} - \Delta \text{SOC1} \times |\text{SOCinit} - \text{SOCmodule}| \quad (14)$$

As described above, if the maximum SOC and the minimum SOC existing in the battery unit 110 are predicted and this prediction result is reflected on the charge and discharge control, the charging and discharging of the battery unit 110 including the batteries 111 electrically connected in multiple series can be reliably controlled. That is, during charging, using the battery 111 of the maximum SOC as a reference, while during discharging, using the battery 111 of the minimum SOC as a reference, the respective batteries 111 can be controlled, and therefore the battery unit 110 can be charge or discharged without overcharging or overdischarging some of the batteries 111.

Note that, in place of SOCinit used in Formulas (11) to (14), SOCmodule before the vehicle travels may be used as the initial value.

Next, the processing, when there is a variation of the SOCs which cannot be fully equalized during the start of travel of a vehicle, is described.

During no load before the vehicle travels, the state detection unit 131 collects the respective inter-terminal voltages of the batteries 111 using the battery management unit 121 and calculates the respective SOCs, and also calculates SOCinitmax which is the maximum SOC, SOCinitave which is the average SOC, and SOCinitmin which is the minimum SOC, respectively. Then, the state detection unit 131 executes the calculations given in Formulas (15), (16) using the predicted maximum SOC and predicted minimum SOC calculated according to Formulas (1) to (2).

$$\text{Predicted maximum SOC2} = \text{predicted maximum SOC} + (\text{SOCinitmax} - \text{SOCinitave}) \quad (15)$$

$$\text{Predicted minimum SOC2} = \text{predicted minimum SOC} - (\text{SOCinitave} - \text{SOCinitmin}) \quad (16)$$

Predicted maximum SOC and predicted minimum SOC: variables which are modified according to the state of charge SOCinitmax−SOCinitave and SOCinitave−SOCinitmin: constants which are not modified according to the state of charge The calculations as described above are executed, so that even when there is a variation of the SOCs which cannot be fully equalized during the start of travel of a vehicle, the battery unit 110 can be reliably charged and discharged taking into consideration an individual difference or a variation in degradation among the batteries 111.

In this embodiment, as described above, the respective SOCs of the batteries 111 constituting the battery unit 110 are detected, and from these SOCs, a variation coefficient of the SOCs is set, and also the maximum SOC and minimum SOC of the battery unit 110 are predicted using this coefficient. Therefore, the calculation processing taking into consideration the variation of the SOCs can be performed without an enormous processing.

Figure 12A:
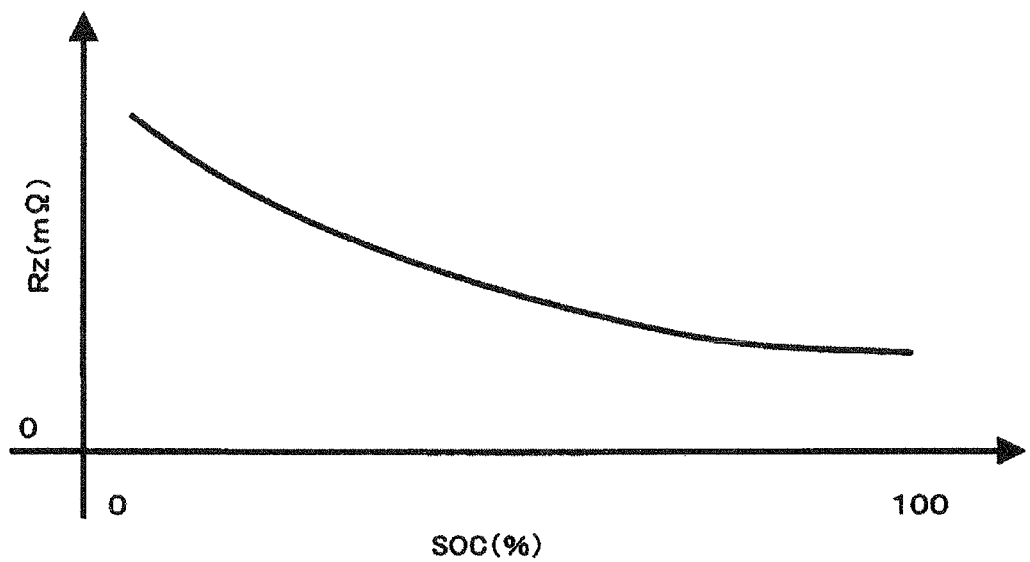
FIG. 12A is a characteristic chart illustrating a relationship between the state of charge of the battery unit of FIG. 2 or a battery constituting the same and an impedance.
Figure 12B:
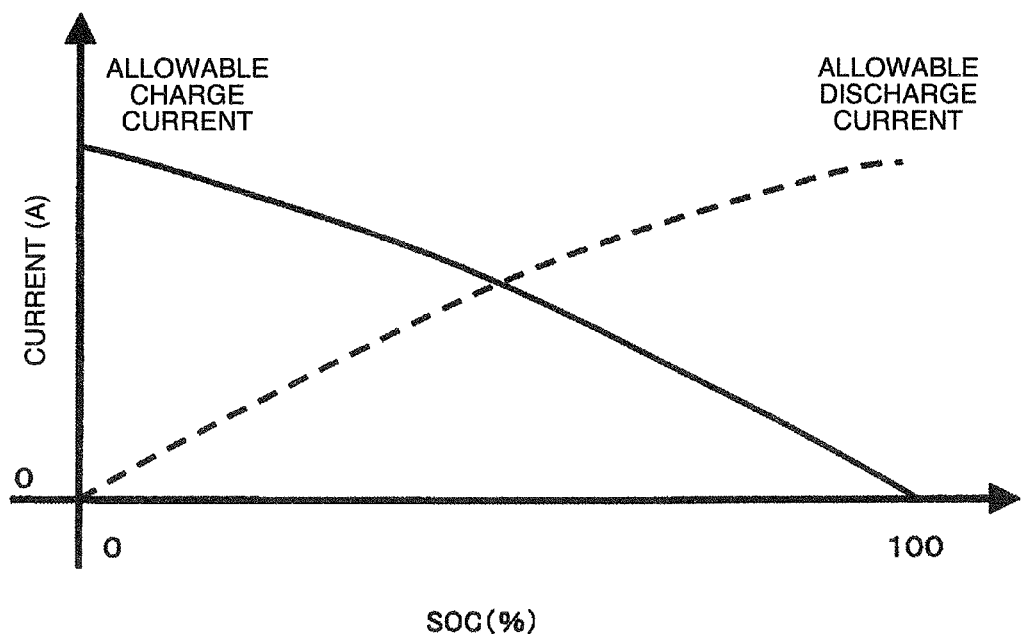
FIG. 12B is a characteristic chart illustrating a relationship between the state of charge of the battery unit of FIG. 2 or a battery constituting the same and allowable charge and discharge currents.

Next, using FIGS. 12A, 12B, a method of controlling the charging and discharging of the battery unit 110 taking into consideration the variation of SOC is described.

FIG. 12A illustrates a relationship between the SOC of the battery unit 110 or battery 111 and an impedance of the battery unit 110 or battery 111. FIG. 12B illustrates a relationship between the SOC of the battery unit 110 or battery 111 and allowable charge and discharge currents. As illustrated in FIG. 12A, the impedance increases as the SOC decreases, and the impedance decreases as the SOC increases. The allowable charge current decrease as the SOC increases, and the allowable charge current increases as the SOC decreases. The allowable discharge current increase as the SOC increases, and the allowable discharge current decreases as the SOC decreases.

In order to control the charging and discharging of the battery unit 110, an allowable charge current Icmax and an allowable discharge current Idmax need to be calculated. The allowable charge current Icmax and the allowable discharge current Idmax can be calculated according to Formulas (17), (18).

$$Ic\text{max} = (V\text{max} - OCV)/Rz \quad (17)$$

$$Id\text{max} = (OCV - V\text{min})/Rz \quad (18)$$

Vmax: upper limit voltage of the battery 111
Vmin: lower limit voltage of the battery 111
Rz: equivalent impedance of the battery 111

Note that, for Vmax, Vmin, Rz, and OCV, either one of a value per unit of battery 111, a value per unit of battery module 112, and a value corresponding to the number of battery modules 112 which the battery unit 110 includes may be used. Moreover, for Rz, more accurate allowable charge and discharge currents can be calculated by setting these values in detail as parameters, such as a value on the charging side, as a value on the discharging side, or as a value at each temperature. As the battery 111 degrades, Rz increases. For this reason, the state of health of the battery 111 is used as a parameter, and this parameter is caused to reflect on Rz used in calculation of the allowable charge and discharge currents, so that the charge and discharge control taking into consideration an increase in Rz is possible.

Among the respective SOCs of the batteries 111, the minimum SOC can be realized using the prediction method described above. Then, the minimum OCV corresponding to the minimum SOC can be calculated from the relationship of FIG. 7 using the predicted minimum SOC. Furthermore, from the impedance characteristic of the battery 111 versus SOC of FIG. 12A, the impedance Rz corresponding to the minimum SOC can be also detected. Using these parameters, the detection of the allowable discharge current with reference to the minimum SOC can be detected. On the other hand, also with regard to the predicted maximum SOC, as with the calculation of the allowable discharge current with reference to the minimum SOC, the allowable charge current with reference to the maximum SOC can be calculated using the maximum OCV corresponding to the maximum SOC and the impedance Rz corresponding to the maximum SOC. By performing the charging and discharging of the battery unit 110 using these allowable charge and discharge currents, the charging and discharging of the battery unit 110 including the batteries 111 electrically connecting in multiple series, among which there is an individual difference or a variation in degradation, can be reliably controlled.

In the embodiment described above, the allowable charge and discharge current calculation method capable of reliably controlling the charging and discharging of the battery unit 110 based on the characteristics of the battery 111 illustrated in FIG. 7 and FIG. 12 has been described. However, depending on the characteristics of the OCV, SOC, and Rz of the battery 111, for example, the allowable discharge current in the average SOC or maximum SOC may be smaller than that in the minimum SOC, or the allowable charge current in the average SOC or minimum SOC may be smaller than that in the maximum SOC. In such cases, first, the OCV and Rz corresponding to each of the predicted maximum SOC, the predicted minimum SOC, and the SOCmodule actually measurable as an average value during charging or discharging of the battery unit 110 are calculated. Then, using the OCV and Rz calculated with respect to the respective SOCs, the allowable charge currents IcmaxSOCmax, IcmaxSOCmin, and IcmaxSOCmodule with reference to the respective maximum SOC, minimum SOC, and SOCmodule are calculated, and also the allowable discharge currents IdmaxSOCmax, IdmaxSOCmin, and IdmaxSOCmodule with reference to the respective maximum SOC, minimum SOC, and SOCmodule are calculated. Then, as given in Formulas (19), (20), the smallest ones among these are set to the final allowable charge current Icmax2 and allowable discharge current Idmax2.

$$Ic\max2 = \text{MIN}(Ic\max SOC\max, Ic\max SOC\min, Ic\max SOC\text{module}) \quad (19)$$

$$Id\max2 = \text{MIN}(Id\max SOC\max, Id\max SOC\min, Id\max SOC\text{module}) \quad (20)$$

By executing the above-described calculations, a battery control device capable of reliably controlling the charge and discharge can be realized even when the battery 111 having characteristics that the allowable discharge current doe not decrease in the minimum SOC and that the allowable charge current does not decrease in the maximum SOC is a target to be controlled.

In the embodiment described above, a case, where the allowable charge and discharge currents are calculated taking into consideration a variation of SOC and where based on this calculation result the charging and discharging of the battery unit 110 are controlled, has been taken as an example. However, these calculated allowable charge and discharge currents may be multiplied by a voltage to calculate charge and discharge powers taking into consideration a variation of SOC, and based on these calculation results the charging and discharging of the battery unit 110 may be controlled.

In the hybrid vehicle, usually, the charging and discharging of the battery unit 110 are controlled with the center of the SOC of the battery unit 110 set to approximately 50%. For this reason, the lower limit SOC (e.g., 30%) and upper limit SOC (e.g., 70%) serving as a use range of the battery unit 110 are set and stored in the vehicle control unit 8. When the predicted minimum SOC reaches the lower limit SOC set as the use range of the battery unit 110, the vehicle control unit 8 controls so as to limit the discharging. Thus, in this embodiment, the batteries 111 constituting the battery unit 110 can be reliably used without their SOCs falling below the lower limit SOC. Moreover, when the predicted maximum SOC reaches the upper limit SOC set as the use range of the battery unit 110, the vehicle control unit 8 controls so as to limit the charging. Moreover, also in charging in a high SOC by the battery charger 500 or the like, similarly, when the predicted maximum SOC reaches a charge target SOC, the vehicle control unit 8 limits the charging. Thus, in this embodiment, the batteries 111 constituting the battery unit 110 can be reliably used without their SOCs exceeding the upper limit SOC. The setting values of the lower limit SOC and upper limit SOC serving as the use range of the battery unit 110 may be stored in other control unit including a storage unit of the state detection unit 131.

According to this embodiment described above, an influence from an individual difference or a variation in degradation among the batteries 111 constituting the battery unit 110, i.e., a variation of SOC, is predicted, and based on this predicted variation of SOC, the allowable charge and discharge currents or allowable charge and discharge powers are calculated, and based on these calculated allowable charge and discharge currents or allowable charge and discharge powers, the charging and discharging of the battery unit 110 are controlled. Therefore, the reliable charge and discharge control taking into consideration all the states of the batteries 111 constituting the battery unit 110 can be realized. In addition, according to this embodiment, the predicted variation of SOC is held as a coefficient, and based on this coefficient, a variation of SOC in future is predicted, so that the allowable charge and discharge currents or charge and discharge powers based on the predicted variation of SOC can be calculated by the calculation with a small processing amount (load).

As described above, in this embodiment, the charge and discharge control of the battery unit 110 have been described. However, the followings can be also performed by using the allowable charge and discharge currents or charge and discharge powers taking into consideration a variation of SOC. That is, the allowable charge and discharge currents or charge and discharge powers taking into consideration a variation of SOC is compared with a value requested by the vehicle system and if the allowable charge and discharge currents or charge and discharge powers fall below the value requested by the vehicle system, the battery unit 110 is determined as having come to the end of its life. Such life determination of the battery unit 110 can be made. According to this embodiment, the life of the battery unit 110 is predicted based on the allowable charge and discharge currents or charge and discharge powers taking into consideration a variation of SOC, so that an accurate life determination can be made.

Moreover, as described above, in this embodiment, the calculated ΔSOC1 and ΔSOC2 are used to predict the maximum SOC and minimum SOC. However, using these SOCs, the following can be also performed. That is, when the calculated ΔSOC1 and ΔSOC2 exceed a predetermined threshold value or when a predicted variation of SOC exceeds a predetermined threshold value, the battery unit 110 is determined as abnormal. Such an abnormality diagnosis of the battery unit 110 can be conducted. As the method of diagnosing an abnormality of the battery unit 110, there is also a method including the steps of: calculating the variation coefficient of SOC with respect to the batteries 111; and analyzing a distribution of variations of SOC to diagnose an abnormality of the battery unit 110. A variation of SOC caused by the variation of the capacity of the battery 111 involved in manufacturing batteries is calculated in advance, and when a value exceeding this calculated value is detected, the battery unit 110 is determined as abnormal Moreover, the battery unit 110 may be diagnosed as abnormal at a time when the value exceeds a manufacturing variation, or a margin may be set to the threshold value, for example, by setting a margin in diagnosis and permitting a variation which exceeds the manufacturing variation to a certain extent.

The results of the abnormality diagnosis described above are displayed on a display screen 600 for displaying the state of energy supply, the display screen 600 being installed in the vehicle interior, as illustrated in FIG. 13 and FIG. 14. On the display screen 600, there are displayed the configuration on the side of a driven body including the driving wheel 2, the axle 3, and a differential gear 7, and the respective symbols of the engine 4 which is the driving source, the battery 100 serving as the power supply of the motor generator 200, and an arrow indicating the energy flow, so that the present energy flow is visible. Moreover, for the symbol of the battery 100, a symbol is displayed for each battery module 112. On the symbols of the battery modules 112a, 112b, there is a display indicating the respective states.

Note that, reference numeral attached to each symbol is attached in order to express a correspondence with the configurations of FIG. 1 to FIG. 3, and is actually not displayed.

When the battery modules 112a, 112b are normal as a result of the abnormality diagnosis, a display of "good" is put on the respective symbols of the battery modules 112a, 112b, as illustrated in FIG. 13. If as a result of the abnormality diagnosis, there is an abnormality in the battery module 112a, for example, then a display of "abnormal" is put on the symbol of the battery module 112a, as illustrated in FIG. 14. This case may involve an aural alarm, such a warning beep, or a visual alarm, such as the flickering of the symbol. With such a notification, the driver can immediately recognize an abnormality in the battery 100 and can immediately transport the PHEV 1 to a repair shop, such as a service center. Moreover, with this display and the like, a person in charge of repair can immediately identify which battery module 112 has an abnormality, and can immediately replace the abnormal battery module 112.

The operation described above can be realized as follows. The state detection unit 131, upon receipt of an abnormality signal output from the battery management units 121a, 121b having detected an abnormality, recognizes the presence or absence of the abnormality. Upon return of a command signal for identifying the abnormal content (the cause), the command signal being transmitted to the battery management units 121a, 121b having detected the abnormality, the state detection unit 131 recognizes the abnormal content. Subsequently, the state detection unit 131 transmits an abnormality notification signal including an abnormality display notification and the information (address information) indicative of the abnormal battery module 112 to the vehicle control unit 8. Based on the abnormality notification signal output from the state detection unit 131, the vehicle control unit 8 transmits to the display device a command signal (display control signal) for setting the display of the symbol of the abnormal battery module 112 to the display of "abnormal". Based on the command signal output from the vehicle control unit 8, the display device sets the display of the symbol of the abnormal battery module 112 on the display screen 600 to the display of "abnormal".

Note that, in this embodiment, a case, where the vehicle control unit 8 having received the abnormality notification signal output from the state detection unit 131 outputs to the display device a command signal for setting the display of the symbol of the abnormal battery module 112 to the display of "abnormal" and causes the display device to display the same, is taken as an example and described, however, this command signal may be directly transmitted from the state detection unit 131 to the display device to cause the display device to display.

Figure 15:
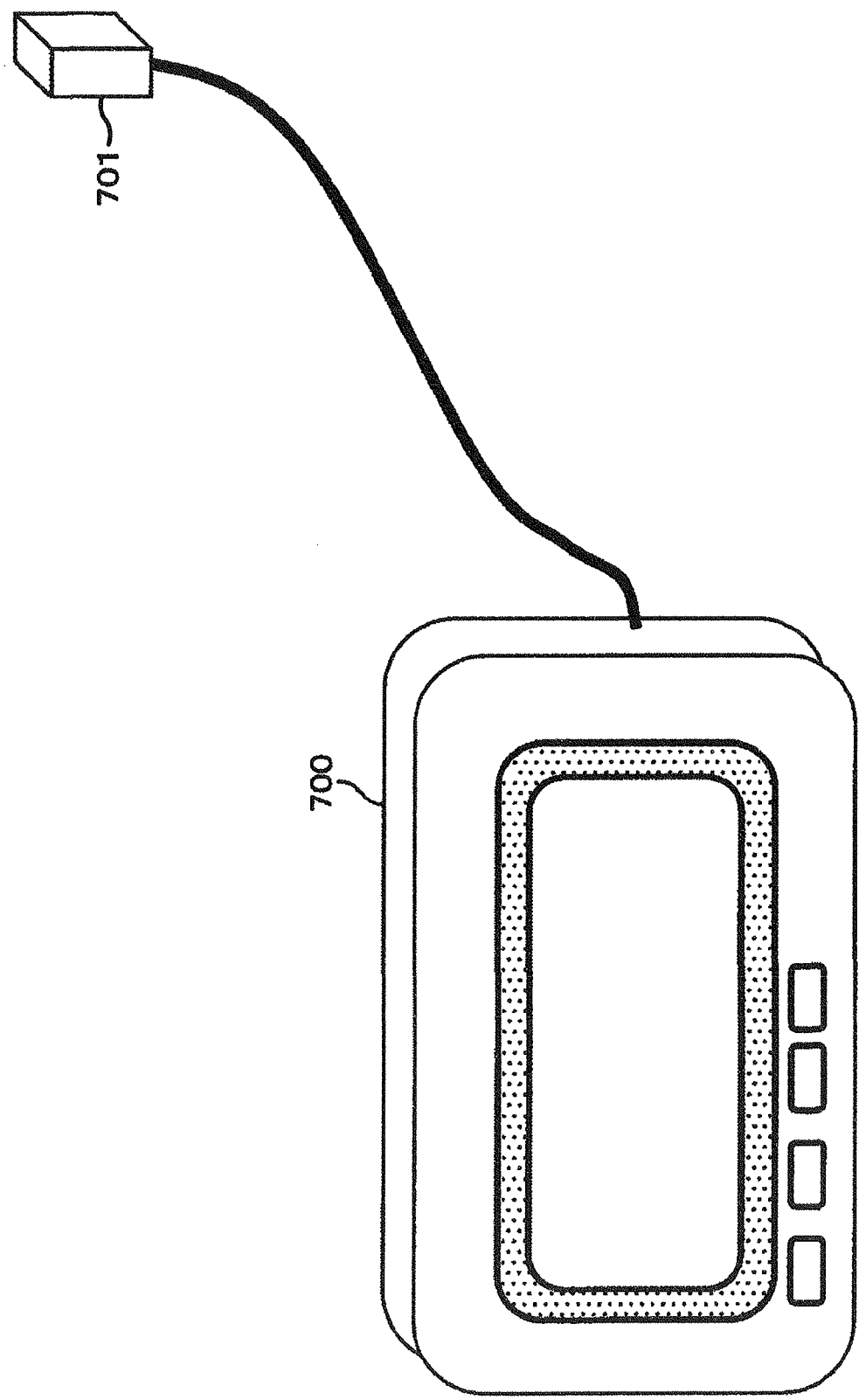
FIG. 15 is a plan view illustrating the external configuration of a portable information device capable of displaying the electrical energy of the drive system of the plug-in hybrid electric vehicle of FIG. 1 and the SOH's of a plurality of battery modules constituting the battery unit of FIG. 2.

In the above, a case where an abnormality in the battery 100 is notified by means of the screen 600 mounted in the vehicle interior has been described. However, for example, when the screen 600 illustrated in FIG. 13 and FIG. 14 is not mounted in the vehicle interior, or when the function as illustrated in FIG. 13 and FIG. 14 is not provided, or when a service person desires to work while viewing a display screen in the vicinity of the battery 100 at the time of inspection, as illustrated in FIG. 15, a portable information device 700 may be connected to an external interface of the local area network of an automobile or to a communication interface of the battery control unit 130 via a connector 701, so that abnormality information can be obtained from the state detection unit 131 and a screen similar to FIG. 13 and FIG. 14 can be displayed.

Note that, in this embodiment, as an abnormality notification means, the screen display is taken as an example, however, a voice or a simple character string display may be used as long as the abnormality notification means can identify the abnormal battery module 112. Moreover, the abnormality notification means may be a unit which displays on a screen the appearance of the battery unit 110 installed inside an automobile seen from thereabove, and which, when an abnormality occurs in the battery module 112, sets the symbol of the abnormal battery module 112 to an identifiable display for notifying.

Furthermore, the abnormality notification of the battery module 112 is preferably notified corresponding to all the abnormal causes, such as overcharge, overdischarge, and overtemperature. Thus, the replacement work of the battery module 112 in the unit of battery module 112 can be facilitated corresponding to all the abnormal causes. Moreover, whether the abnormality cause of the battery module 112 is an individual difference of the battery 111 exceeding a predetermined threshold value; or an abnormal distribution of individual differences of the batteries 111; or overcharge, overdischarge, and overtemperature; or a decrease in the capacity of the battery 111 or a degradation in the input performance or output performance of the battery 111, i.e., an abnormal area, can be easily notified to the driver, a repair worker, or the like by using an identifiable display, sound, or the like. In addition, the selection or determination of a method of dealing with the abnormality, the corresponding repair or replacement work of the battery module 112, and the like can be facilitated.

With regard to the abnormalities, such as overcharge, overdischarge, and overtemperature, the battery control unit 130 collects, via the cell control unit 120, the information about the battery 111 or battery module 112, in which this abnormality occurs, and examines which battery management unit 121 has detected this, and displays or notifies by sounds only the battery module 112 corresponding to the battery management unit 121 having detected this abnormality, as abnormal. With regard to the abnormality in an individual difference among the battery modules 112, the battery module 112 corresponding to the battery management unit 121 having detected a characteristic variation exceeding the capacity variation or internal-resistance variation due to an individual difference occurring in manufacturing the battery 111 is notified as abnormal. The internal resistance and battery capacity are detected for each battery management unit 121 (for each battery module 112), and when the battery performance falls below a system requirement, the battery module 112 corresponding to the battery management unit 121 having detected this fact may be notified as abnormal. The internal resistance can be detected with a voltage change measured by the battery management unit 121 and a current change measured by the current measurement unit 170. Moreover, the battery capacity can be calculated from the voltage change measured by the battery management unit 121 relative to the integral value of the current measured by the current measurement unit 170.

The operation described above can be realized as follows. As with the operation described above, the vehicle control unit 8 having received the abnormality notification signal output from the state detection unit 131 outputs to the display device a command signal for setting the display of the symbol of the abnormal battery module 112 to the display of "abnormal" and causes the display device to display the same or this command signal is directly transmitted from the state detection unit 131 to the display device to cause the display device to display the same.

Note that, with regard to an abnormality in an individual difference of the battery module 112, unlike the abnormalities, such as overcharge, overdischarge, and overtemperature, at a time point when the variation coefficient becomes equal to or greater than a threshold value, e.g., at a time point when the variation coefficient equal to or greater than the threshold value is obtained in the calculation process of the variation coefficient after the vehicle travels, preferably before the battery charger 500 starts to charge, the abnormality is notified by the same operation as that described above. Moreover, the abnormal result is stored in a memory in advance, and when the vehicle is started, i.e., at a time point when the ignition key switch is turned on and the control unit is activated, the abnormality is promptly notified.

According to the abnormality notification method of this embodiment described above, the replacement work of the battery module 112 in the unit of battery module 112 can be facilitated.

Embodiment 2

Figure 16:
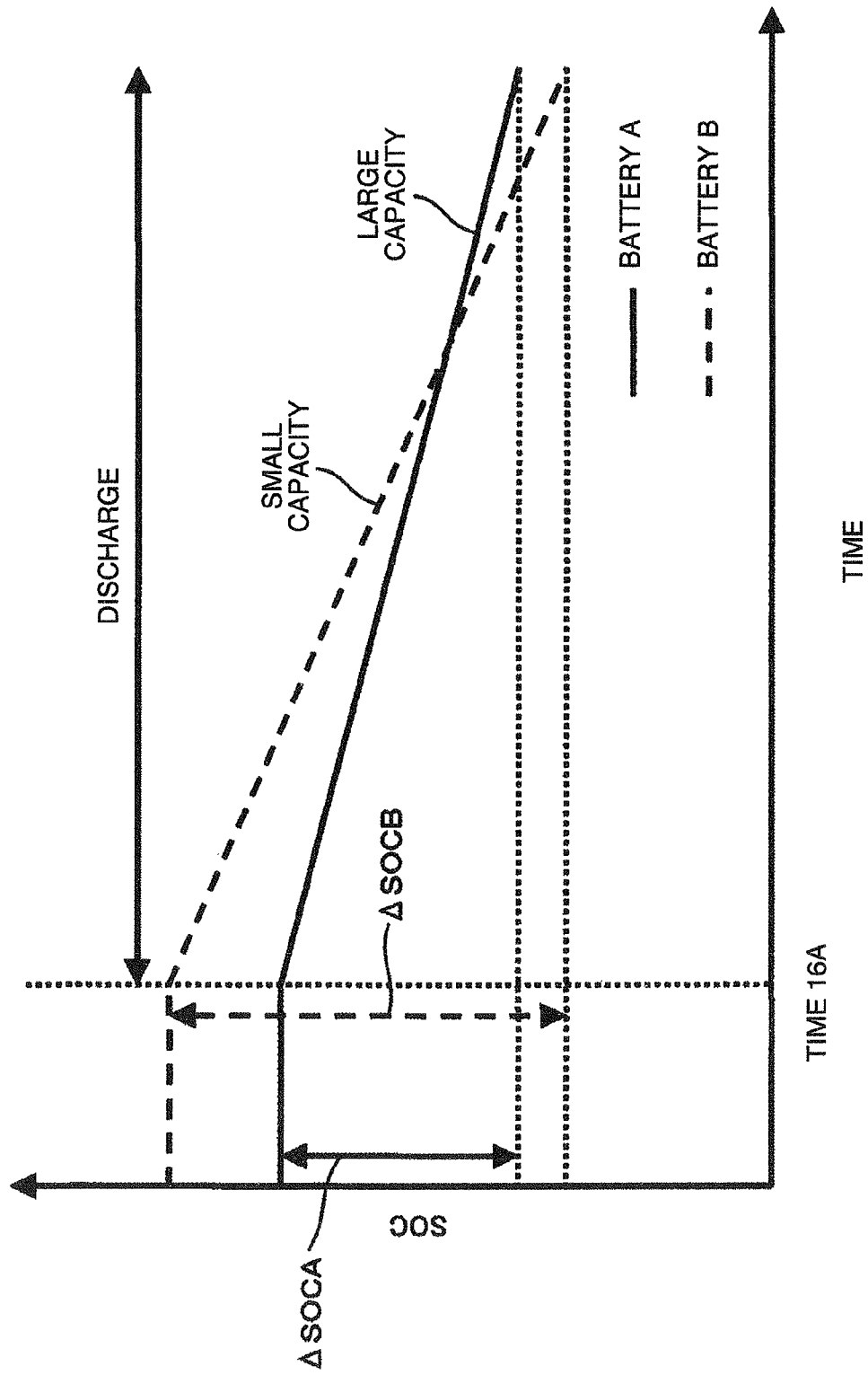
FIG. 16 is a characteristic chart illustrating a second example of the present invention, illustrating temporal changes in the states of charge of the batteries A, B each having a different capacity when the battery unit goes from a no-load state to a state of charge or discharge (load operation state).

A second embodiment of the present invention is described based on FIG. 16.

This embodiment is a modification of the first embodiment, and the processing content of the state detection unit 131 differs from the first embodiment. Other configurations and functions are the same as those of the first embodiment. Accordingly, in the description below, only a portion different from the first embodiment is described.

Assume that the battery 111 having a large capacity when fully charged is the battery A and the battery 111 having a small capacity when fully charged is the battery B and that a relationship between the SOCs of the both batteries before the vehicle travels is the SOC of the battery B>SOC of the battery A. In this case, when the battery unit 110 starts discharging at a time 16A, the SOC of the battery B having a small capacity immediately drops ($\Delta$SOCB), and the SOC of the battery A having a large capacity does not immediately drops ($\Delta$SOCA), and therefore, the variation of the SOCs is improved in the middle of discharging, and hereafter the relationship between the SOCs of the batteries A, B is reversed. In this way, when the SOCs of the batteries A, B are not equalized before the battery unit 110 is used, a phenomenon as shown in FIG. 16 occurs.

Then, in this embodiment, even if the equalization is not yet attained before the vehicle travels (before the battery unit 110 is used), as with the first embodiment, the charging and discharging of the battery unit 110 can be controlled correspondingly to an individual difference and a variations in degradation among the batteries 111 constituting the battery unit 110.

First, in the no-load state represented by before the start of travel of a vehicle, the respective inter-terminal voltages of the batteries 111 are measured and the respective SOCs of the batteries 111 are calculated, and in the no-load state, in which a predetermined time has elapsed after the charging and discharging of the battery unit 110 are terminated, represented by after the vehicle travels, the respective SOCs of the batteries 111 are calculated similarly.

Next, among the respective calculated SOCs of the batteries 111, the respective SOCs of the batteries 111 calculated in the former state are denoted by SOCinit1, SOCinit2, . . . , SOCinitN, and the respective SOCs of the batteries 111 calculated in the latter state are denoted by SOClast1, SOClast2, SOClastN, and then with regard to each of the batteries 111, a change (SOCinit_last) in SOC before and after the use of the battery unit 110 is calculated according to Formula (21).

$$SOCinit\_last1 = |SOCinit1 - SOClast1|$$

$$SOCinit\_last2 = |SOCinit2 - SOClast2|$$

$$SOCinit\_lastN = |SOCinitN - SOClastN| \quad (21)$$

Note that, the numbers 1 to N added to the end of SOCinit or SOClast indicate the respective numbers of the batteries 111 constituting the battery unit 110. Accordingly, when the same number is added, it means that SOCinit and SOClast are those obtained in the same battery 111.

Next, using the change SOCinit_last of the respective SOCs of the batteries 111 calculated according to Formula (21), the average value SOCinit_last_ave of the changed SOCs is calculated according to Formula (22).

$$SOCInit\_last\_ave = (SOCinit\_last1 + SOCinit\_last2 + \ldots SOCinit\_lastN)/N \quad (22)$$

Next, using the average value SOCinit_last_ave of the changed SOCs calculated according to Formula (22) and the change SOCinit_last of the respective SOCs of the batteries 111, a coefficient for indicating whether the change in the respective SOCs of the batteries 111 relative to the average change in SOCs is large or small, i.e., the variation coefficients of the respective SOCs of the batteries 111 are calculated according to Formula (23).

$$\Delta SOCinit\_last1 = SOCinit\_last1/SOCinit\_last\_ave$$

$$\Delta SOCinit\_last2 = SOCinit\_last2/SOCinit\_last\_ave$$

$$\Delta SOCinit\_lastN = SOCinit\_lastN/SOCinit\_last\_ave \quad (23)$$

Next, for each of the batteries 111, a predicted value of SOC taking into consideration the variation of SOC is calculated according to Formula (24).

$$\text{Predicted SOC1} = SOCinit1 + \Delta SOCinit\_last1 \times (SOCmodule\_cur - SOCmodule\_init)$$

$$\text{Predicted SOC2} = SOCinit2 + \Delta SOCinit\_last2 \times (SOCmodule\_cur - SOCmodule\_init)$$

$$\text{Predicted SOC}N = SOCinitN + \Delta SOCinit\_lastN \times (SOCmodule\_cur - SOCmodule\_init) \quad (24)$$

Here, SOCmodule represents the average SOC of the battery unit 110, which is calculated using the measurement information obtained from the measurement signals of the voltage measurement unit 160, the current measurement unit 170, and the like in the state of charge or discharge of the battery unit 110 while the vehicle is traveling. SOCmodule_init represents SOCmodule before the vehicle travels and SOCmodule_cur represents the present SOC when the vehicle is traveling, respectively.

Next, the predicted maximum SOC and the predicted minimum SOC are calculated according to Formulas (25), (26) from the predicted SOC1, the predicted SOC2, . . . , predicted SOCN calculated according to Formula (24). That is, among these predicted SOCs, the largest predicted SOC is set to the predicted maximum SOC. Moreover, among these predicted SOCs, the smallest predicted SOC is set to the predicted minimum SOC.

$$\text{Predicted maximum SOC} = \text{MAX (predicted SOC1,} \\ \text{predicted SOC2, ..., predicted SOCN)} \quad (25)$$

$$\text{Predicted minimum SOC} = \text{MIN (predicted SOC1,} \\ \text{predicted SOC2, ..., predicted SOCN)} \quad (26)$$

Next, using the predicted maximum SOC and predicted minimum SOC calculated according to Formulas (25), (26), as with the first embodiment, the allowable charge and discharge currents are calculated according to Formulas (17), (18). Moreover, if the allowable charge and discharge currents are multiplied by the voltage of the battery unit 110, the allowable charge and discharge powers can be calculated, respectively. Then, the calculated allowable charge and discharge currents or allowable charge and discharge powers can be used as the parameters for controlling the charging and discharging of the battery unit 110, as with the first embodiment.

Also with the above calculation method, the charging and discharging of the battery unit 110 can be controlled corresponding to an individual difference and a variation in degradation among the batteries 111 constituting the battery unit 110. Therefore, according to this embodiment, the same operational effect as the first embodiment can be attained.

As with the first embodiment, if the allowable charge current is calculated based on the predicted maximum SOC and the allowable discharge current is calculated based on the predicted minimum SOC, the battery unit 110 can be reliably charged and discharged.

Moreover, for example, if the allowable discharge current based on the average SOC or maximum SOC is smaller than the allowable discharge current based on the minimum SOC, or the allowable charge current based on the average SOC or minimum SOC is smaller than the allowable charge current based on the maximum SOC, depending on the characteristics of OCV, SOC, and Rz of the battery 111, then as with the first embodiment, with regard to each of the predicted maximum SOC, predicted minimum SOC, and SOCmodule, the allowable charge current and the allowable discharge current are calculated, and according to Formulas (19), (20), the smallest allowable charge and discharge currents may be set to the final allowable charge and discharge currents.

Furthermore, when the predicted maximum SOC reaches the upper limit SOC of the battery specification, the charging of the battery unit 110 is limited and when the predicted maximum SOC reaches the lower limit SOC of the battery specification, the discharging of the battery unit 110 is limited, and thereby the charging and discharging of the battery unit 110 can be reliably controlled so that all of the batteries 111 constituting the battery unit 110 will not depart from the set use range of SOC. Therefore, the same operational effect as the first embodiment can be attained.

Furthermore, a determination of the life of the battery unit 110, wherein the allowable charge and discharge currents or allowable charge and discharge powers taking into consideration the variation of SOC are compared with the values requested by the vehicle system, respectively, and if the allowable charge and discharge currents or allowable charge and discharge powers taking into consideration the variation of SOC fall below the values requested by the vehicle system, respectively, it is determined that the battery unit 110 has come to the end of its life; an abnormality diagnosis of the battery 111 based on the variation coefficient of SOC calculated according to Formula (23); an abnormality display based on this abnormality diagnosis; and the like can be performed as with the first embodiment. Therefore, the same operational effect as the first embodiment can be attained.

Embodiment 3

Figure 17:
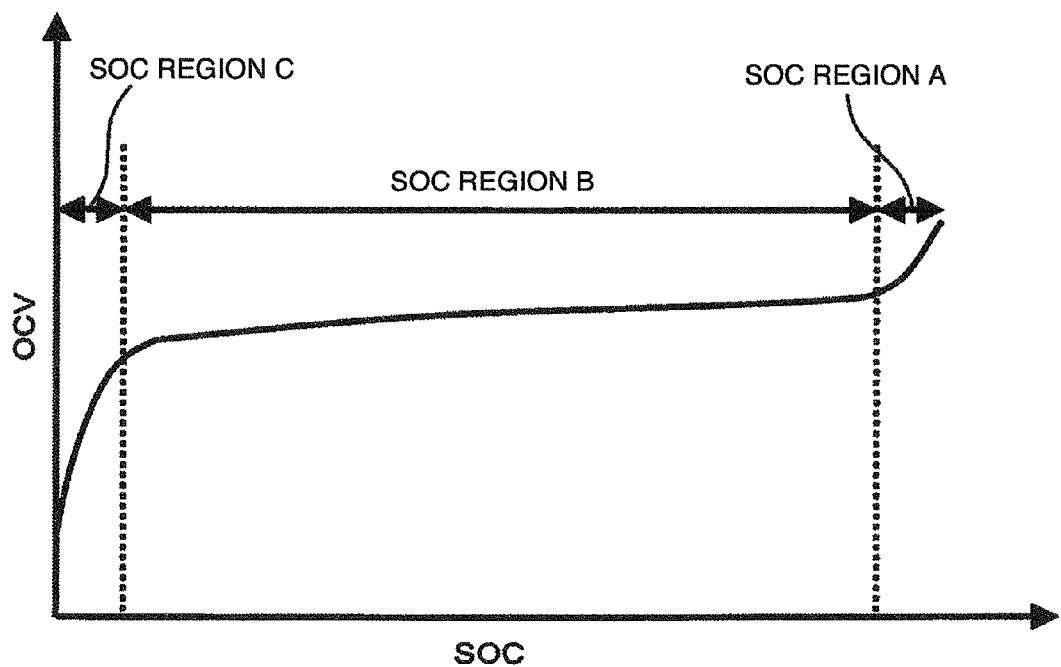
FIG. 17 is a characteristic chart illustrating a third example of the present invention, illustrating a relationship between the electromotive force of a battery and the state of charge.

A third embodiment of the present invention is described based on FIG. 17.

This embodiment is a modification of the first and second embodiments, and the processing contents of the state detection unit 131 and the vehicle control unit 8 differ from the first and second embodiments. Other configurations and functions are the same as those of the first and second embodiments. Accordingly, in the description below, only a portion different from the first and second embodiments is described.

FIG. 17 illustrates a relationship between OCV and SOC of a certain type of battery 111. As illustrated in FIG. 17, in an SOC region A and an SOC region C, OCV abruptly changes with SOC. On the other hand, in an SOC region B, OCV does not change with respect to SOC or its change is very slow (the gradient of the change in the SOC region B is slow relative to those in the SOC region A and the SOC region C). As described above, in the characteristic of the battery 111 as illustrated in FIG. 17, OCV does not change with the change in SOC or its change is very slow. In the case of such a characteristic, even if before the vehicle travels or after a predetermined time has elapsed after the vehicle travels, the inter-terminal voltage of each of the batteries 111 is detected and the SOC of each of the batteries 111 is calculated, and the variation of SOC of each of the battery unit 110 is attempted to be detected based on the calculated SOC of each of the batteries 111, the detection may be difficult.

Note that, the SOC region A and the SOC region C refer to the SOC regions deviating from a range of the upper limit SOC and lower limit SOC of the use range of the hybrid vehicle, e.g., the SOC regions deviating from the range of 30% to 70%.

Then, in this embodiment, when there is the battery 111 having the characteristic as illustrated in FIG. 17, a torque command signal (a negative torque command) with respect to the motor generator 200 is output from the vehicle control unit 8 to the motor control unit 340 of the inverter device 300 to operate the motor generator 200 as a generator, and the battery unit 110 is charged until SOC reaches the SOC region A. In the cases of the plug-in hybrid electric vehicle, an electric vehicle, and the like, the battery charger 500 is operated to charge the battery unit 110 until SOC reaches the SOC region A. Next, a torque command signal (a positive torque command) with respect to the motor generator 200 is output from the vehicle control unit 8 to the motor control unit 340 of the inverter device 300 to operate the motor generator 200 as a generator, and the battery unit 110 charged to the SOA region A is discharged until SOC reaches the SOC region C. Moreover, when the SOC of the battery unit 110 decreases and is in the SOC region B after the vehicle travels, the motor generator 200 is operated as a motor and the battery unit 110 is discharged until SOC reaches the SOC region C. When the SOC of the battery unit 110 is already discharged to the SOC region C as the vehicle travels, these operations are not necessary.

The operations as described above can be realized as follows: a command signal for charging or discharging the battery unit 110 is output from the state detection unit 131 having detected SOC of the battery unit 110 to the vehicle control unit 8, and based on this command signal, the vehicle control unit 8 controls the actuation of the inverter device 300 to drive the motor generator 200 or drive the engine 4, thereby charging or discharging the battery unit 110.

By performing the operation as described above, even if the battery 111 having such a characteristic illustrated in FIG. 17 is a target to be controlled, before the vehicle travels, the SOC of the battery unit 110 can be adjusted to the SOC region A where OCV varies, while after the vehicle travels, the SOC of the battery unit 110 can be adjusted to the SOC region C where OCV varies. Accordingly, a forecasting calculation for calculating the variation of SOC based on an individual difference and a variation in degradation of the battery 111 by the state detection unit 131 of the first and second embodiments can be reliably performed. Therefore, according to this embodiment, even if the battery 111 having such a characteristic illustrated in FIG. 17 is a target to be controlled, the charging and discharging of the battery unit 110 taking into consideration the variation of SOC based on an individual difference or a variation in degradation of the battery 111 can be reliably controlled. The above description has been made with regard to the embodiments, but the present invention is not limited thereto, and it is apparent to those skilled in the art that various kinds of changes and modifications can be made within the spirit of the present invention and the scope of the attached claims.

The invention claimed is:

1. An electric storage device, comprising:
   an electric storage unit including a plurality of electrically connected electric storage elements;
   a first control unit measuring a state of each of the electric storage elements;
   a measurement unit measuring a state of the electric storage unit; and
   a second control unit which captures measurement state information about each of the electric storage elements measured by the first control unit and measurement state information about the electric storage unit measured by the measurement unit, and manages and controls the state of the electric storage unit, wherein the second control unit includes:
   a unit which captures measurement state information about each of the electric storage elements in a no-load state before or after a loaded state where the electric storage unit is connected to a load, and calculates an amount of change of an average state of charge of the electric storage elements in the no-load state before or after the loaded state, and a difference between an average state of charge of the electric storage elements in a no-load state after the loaded state and a state of charge of a predetermined electric storage element, and which further calculates a charge-state variation coefficient which is the difference per amount of change of the average state of charge of the electric storage elements in the no-load state before or after the loaded state; and
   a unit which captures the measurement state information about the electric storage unit in the loaded state and calculates an amount of change of the average state of charge of the electric storage elements in the loaded state, and which further predicts a state of charge of a predetermined electric storage element based on the average state of charge of the electric storage elements in the loaded state and the charge-state variation coefficient.

2. The electric storage device according to claim 1, wherein the second control unit captures an inter-terminal voltage of each of the electric storage elements in the no-load state before or after the loaded state, as the measurement state information about each of the electric storage elements and calculates a state of charge of each of the electric storage elements in the no-load state before or after the loaded state, and wherein the second control unit further calculates an average state of charge of the electric storage elements in each of the no-load state before the loaded state and the no-load state after the loaded state, based on this calculated state of charge of each of the electric storage elements.

3. The electric storage device according to claim 2, wherein the second control unit holds the charge-state variation coefficient as information corresponding to an individual difference or a variation in degradation of the electric storage elements, and reads this held information when the electric storage unit is in a loaded state, and predicts a state of charge of the predetermined electric storage element.

4. The electric storage device according to claim 3, wherein the second control unit calculates a predicted maximum state of charge and a predicted minimum state of charge of the electric storage elements, as a state of charge of the predetermined electric storage element to be predicted.

5. The electric storage device according to claim 3, wherein based on at least either one of current information of the electric storage unit measured by the measurement unit, vehicle-speed information from a vehicle side, ignition key switch information from the vehicle side, and opening or closing state information about a relay provided between the electric storage unit and a load side, the second control unit determines whether or not a vehicle is traveling or the electric storage unit is in a no-load state.

6. The electric storage device according to claim 5, wherein before calculating the charge-state variation coefficient in the no-load state, the second control unit, when it is determined based on at least either one of information of the current information, the vehicle-speed information, the ignition key switch information, and the opening or closing state information about the relay that the vehicle is running or the electric storage unit is in a loaded state, stops to calculate the charge-state variation coefficient.

7. The electric storage device according to claim 5, wherein before calculating the charge-state variation coefficient in the no-load state, the second control unit, when it is determined based on at least either one of information of the current information, the vehicle-speed information, the ignition key switch information, and the opening or closing state information about the relay that the vehicle is traveling or the electric storage unit is in a loaded state, prohibits the charging and discharging of the electric storage unit until the charge-state variation coefficient is calculated.

8. The electric storage device according to claim 4, wherein the second control unit limits the charging of the electric storage unit when the predicted maximum state of charge reaches a use upper limit state of charge of the electric storage unit, while when the predicted minimum state of charge reaches a use lower limit state of charge of the electric storage unit, the second control unit limits the discharging of the electric storage unit.

9. The electric storage device according to claim 4, wherein the second control unit calculates an allowable charge current or allowable charge power of the electric storage unit based on the predicted maximum state of charge and calculates an allowable discharge current or allowable discharge power of the electric storage unit based on the predicted minimum state of charge.

10. The electric storage device according to claim 8, wherein the second control unit calculates an allowable charge current or allowable charge power of the electric storage unit based on the predicted maximum state of charge and calculates an allowable discharge current or allowable discharge power of the electric storage unit based on the predicted minimum state of charge.

11. The electric storage device according to claim 4, wherein the second control unit calculates allowable charge and discharge currents or allowable charge and discharge powers based on the respective predicted maximum state of charge, predicted minimum state of charge, and average state of charge of the electric storage unit, and selects the smallest allowable charge and discharge currents or allowable charge and discharge powers among these currents or powers as final allowable charge and discharge currents or allowable charge and discharge powers.

12. The electric storage device according to claim 8, wherein the second control unit calculates allowable charge and discharge currents or allowable charge and discharge powers based on the respective predicted maximum state of charge, predicted minimum state of charge, and average state of charge of the electric storage unit, and selects the smallest allowable charge and discharge currents or allowable charge and discharge powers among these currents or powers as final allowable charge and discharge currents or allowable charge and discharge powers.

13. The electric storage device according to claim 2, wherein when the charge-state variation coefficient exceeds a threshold value thereof, the second control unit determines this as an abnormality in an individual difference of the electric storage element.

14. The electric storage device according to claim 2, wherein when it is determined that there is an abnormality in the electric storage unit, the second control unit outputs a command signal for controlling an abnormality notification notified by an external notification unit so that this abnormality is notified to a driver or operator of a vehicle from the notification unit.

15. The electric storage device according to claim 13, wherein when it is determined that there is an abnormality in the electric storage unit, the second control unit outputs a command signal for controlling an abnormality notification notified by an external notification unit so that this abnormality is notified to a driver or operator of a vehicle from the notification unit.

16. The electric storage device according to claim 14, wherein the notification unit is a display device, which is installed in a vehicle interior and on which an image symbol indicative of the electric storage unit and an SOH of the electric storage unit are displayed, and wherein when it is determined that the electric storage unit is abnormal, the second control unit outputs the command signal so that a display of the SOH displayed on the display device is displayed as "abnormal".

17. The electric storage device according to claim 15, wherein the notification unit is a display device, which is installed in a vehicle interior and on which an image symbol indicative of the electric storage unit and SOH of the electric storage unit are displayed, and wherein when it is determined that the electric storage unit is abnormal, the second control unit outputs the command signal so that a display of the SOH displayed on the display device is displayed as "abnormal".

18. The electric storage device according to claim 1, wherein when as the electric storage element, an electric storage element having a characteristic that a change in an electromotive force in a region of the sate of charge between an upper limit state of charge and a lower limit state of charge of a use range of the state of charge of the electric storage unit in a vehicle is slower than a change in the electromotive force in a region of the state of charge deviating from between the upper limit state of charge and the lower limit state of charge, the second control unit outputs a command signal for charging or discharging the electric storage unit so that the state of charge of the electric storage unit is adjusted to a region of the state of charge deviating from between the upper limit state of charge and the lower limit state of charge.

19. The electric storage device according to claim 14, wherein when either one of abnormalities of overcharge, overdischarge, overtemperature, an abnormality due to a decrease in a capacity or an input performance or output performance, and an abnormality in an individual difference occurs in the electric storage element, the second control unit outputs the command signal.

20. The electric storage device according to claim 15, wherein when either one of abnormalities of overcharge, overdischarge, overtemperature, an abnormality due to a decrease in a capacity or an input performance or output performance, and an abnormality in an individual difference occurs in the electric storage element, the second control unit outputs the command signal.

21. An electric storage device, comprising:
an electric storage unit including a plurality of electrically connected electric storage elements;
a first control unit measuring a state of each of the electric storage elements;
a measurement unit measuring a state of the electric storage unit; and
a second control unit which captures measurement state information about each of the electric storage elements measured by the first control unit and measurement state information about the electric storage unit measured by the measurement unit, and manages and controls a state of the electric storage unit, wherein the second control unit includes:
a unit which captures measurement state information about each of the electric storage elements in a no-load state before or after a loaded state where the electric storage unit is connected to a load, and calculates an amount of change of an average state of charge of the electric storage elements in the no-load state before or after the loaded state, and a difference between an average state of charge of the electric storage elements in a no-load state after the loaded state and the respective maximum and minimum states of charge of the electric storage elements, and which further calculates a charge-state variation coefficient which is the difference per amount of change of the average state of charge of the electric storage elements in the no-load state before or after the loaded state, respectively; and
a unit which captures the measurement state information about the electric storage unit in the loaded state and calculates an amount of change of the average state of charge of the electric storage elements in the loaded state, and which further multiplies the average state of charge of the electric storage elements in the loaded state by the charge-state variation coefficient, respectively, thereby predicting the respective maximum and minimum states of charge of the electric storage elements.

22. An electric storage device, comprising:
an electric storage unit including a plurality of electrically connected electric storage elements;
a first control unit measuring a state of each of the electric storage elements;
a measurement unit measuring a state of the electric storage unit; and
a second control unit which captures measurement state information about each of the electric storage elements measured by the first control unit and measurement state information about the electric storage unit measured by the measurement unit, and manages and controls a state of the electric storage unit, wherein the second control unit includes:

a unit which captures measurement state information about each of the electric storage elements in a no-load state before or after a loaded state where the electric storage unit is connected to a load, and calculates an amount of change of a state of charge of each of the electric storage elements in the no-load state before and after the loaded state and an amount of change of an average state of charge of the electric storage elements in a no-load state before and after the loaded state, and which further calculates a charge-state variation coefficient which is an amount of change of the state of charge of each of the electric storage elements per amount of change of the average state of charge of the electric storage elements, respectively; and a unit which captures the measurement state information about the electric storage unit in the loaded state and calculates an amount of change of the average state of charge of the electric storage elements in the loaded state, and which further multiplies the average state of charge of the electric storage elements in the loaded state by each of the charge-state variation coefficients, thereby predicting a state of charge of each of the electric storage elements.

23. The electric storage device according to claim 22, wherein the second control unit selects the maximum state of charge and the minimum state of charge from the predicted state of charge of each of the electric storage elements.

* * * * *